(12) United States Patent
Gitter et al.

(10) Patent No.: US 12,411,554 B2
(45) Date of Patent: Sep. 9, 2025

(54) METHOD OF DISPLAYING SELECTABLE OPTIONS

(71) Applicant: Apple Inc., Cupertino, CA (US)

(72) Inventors: Nathan Gitter, Cupertino, CA (US); Jordan A. Cazamias, Conroe, TX (US); Alexis H. Palangie, Palo Alto, CA (US); Aaron M. Burns, Sunnyvale, CA (US); Benjamin Hylak, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/182,298

(22) Filed: Mar. 10, 2023

(65) Prior Publication Data

US 2023/0325003 A1 Oct. 12, 2023

Related U.S. Application Data

(63) Continuation of application No. PCT/US2021/049129, filed on Sep. 3, 2021.

(60) Provisional application No. 63/077,111, filed on Sep. 11, 2020.

(51) Int. Cl.
*G06F 3/01* (2006.01)
*G06F 3/0482* (2013.01)
*G06V 40/20* (2022.01)

(52) U.S. Cl.
CPC ............. *G06F 3/017* (2013.01); *G06F 3/013* (2013.01); *G06F 3/0482* (2013.01); *G06V 40/28* (2022.01)

(58) Field of Classification Search
CPC ........ G06F 3/017; G06F 3/013; G06F 3/0482; G06V 40/28
See application file for complete search history.

(56) References Cited

U.S. PATENT DOCUMENTS

| | | | |
|---|---|---|---|
| 8,643,680 B2 | 2/2014 | Baldwin et al. | |
| 12,008,216 B1 * | 6/2024 | Boesel | G06F 3/0483 |
| 2016/0179205 A1 * | 6/2016 | Katz | G06F 3/013 |
| | | | 345/156 |
| 2018/0120944 A1 * | 5/2018 | Wang | G06F 1/163 |
| 2019/0212827 A1 * | 7/2019 | Kin | G02B 27/0172 |
| 2019/0362557 A1 | 11/2019 | Lacey et al. | |
| 2020/0097065 A1 * | 3/2020 | Iyer | G06F 3/017 |
| 2022/0100270 A1 * | 3/2022 | Pastrana Vicente | G06F 3/013 |

(Continued)

OTHER PUBLICATIONS

International Search Report received for PCT Patent Application No. PCT/US2021/049129, mailed on Dec. 6, 2021, 5 pages.

(Continued)

*Primary Examiner* — Cao H Nguyen
(74) *Attorney, Agent, or Firm* — Kubota & Basol LLP

(57) ABSTRACT

Methods for displaying selectable options in a computer-generated environment provide for an efficient and intuitive user experience. In some embodiments, one or more selectable options are displayed in a three-dimensional computer-generated environment in accordance with the determination that the one or more criteria have been satisfied, including a criteria that a hand of the user is oriented in a predetermined manner with respect to an electronic device. In some embodiments, a user is able to perform one-handed actuation of a selectable option with a plurality of user inputs and/or gestures that satisfy one or more activation criteria.

51 Claims, 15 Drawing Sheets

(56) References Cited

U.S. PATENT DOCUMENTS

2023/0350537 A1\* 11/2023 Hylak ................ G06F 3/04845

OTHER PUBLICATIONS

Farmer, John, "Playing with Leap Motion Hand Ui Designs and Anatomy Interactions for Work", Twitter Tweet, Available online at: https://twitter.com/jfarmer1978/status/1016469522663034880, Jul. 10, 2018, [retrieved on Jun. 26, 2023], 2 pages.

Hansen et al., "Noise Tolerant Selection by Gaze-Controlled Pan and Zoom in 3D", ETRA 2008, Savannah, Georgia, Mar. 26-28, 2008, pp. 205-212.

Kumar et al., "EyePoint: Practical Pointing and Selection Using Gaze and Keyboard", CHI 2007, Apr. 28-May 3, 2007, 10 pages.

Miller, Cameron, "Hand UI Reveal Gesture", Vimeo, Available online at: https://vimeo.com/265614750, [retrieved on Jun. 26, 2023], 3 pages.

Pfeuffer et al., "Gaze +Pinch Interaction in Virtual Reality", In Proceedings of SUI '17, Brighton, United Kingdom, Oct. 16-17, 2017, pp. 99-108.

\* cited by examiner

METHOD OF DISPLAYING SELECTABLE OPTIONS

CROSS-REFERENCE TO RELATED APPLICATIONS

This application is a continuation of International Application No. PCT/US2021/049129, filed Sep. 3, 2021, which claims the benefit of U.S. Provisional Application No. 63/077,111, filed Sep. 11, 2020, the contents of which are herein incorporated by reference in their entireties for all purposes.

FIELD OF THE DISCLOSURE

This relates generally to methods for displaying selectable options in a computer-generated environment.

BACKGROUND OF THE DISCLOSURE

Computer-generated environments are environments where at least some objects displayed for a user's viewing are generated using a computer. Users may interact with a computer-generated environment by causing display of a menu and/or selectable options from a menu user interface.

SUMMARY OF THE DISCLOSURE

Some embodiments described in this disclosure are directed to methods for displaying selectable options (e.g., control elements or control user interface elements) in a computer-generated environment. Some embodiments described in this disclosure are directed to one-handed actuation of selectable options. These interactions provide a more efficient and intuitive user experience. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
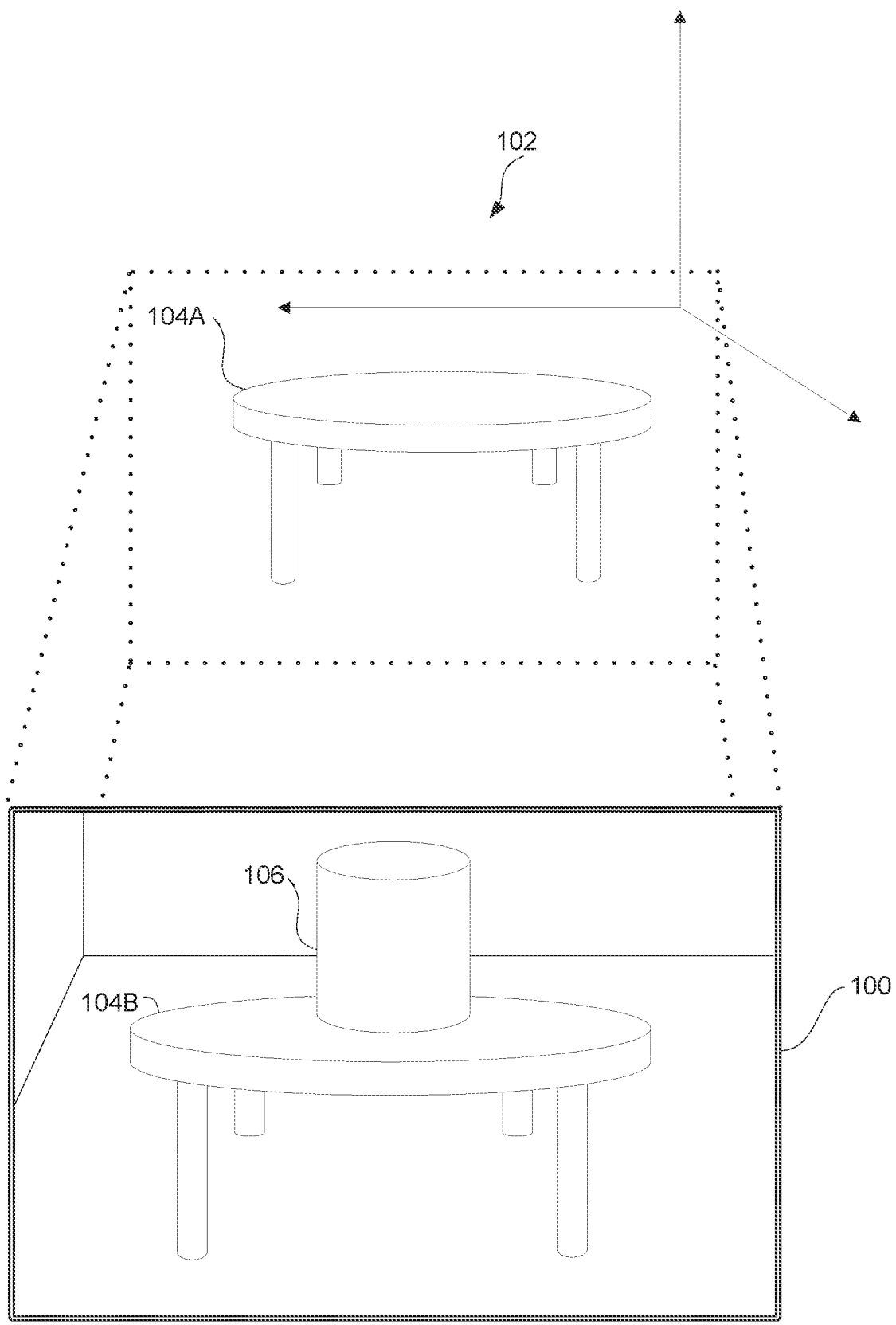
FIG. 1 illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. An XR environment is often referred to herein as a computer-generated environment. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic devices can enable a user to interact with and/or sense an XR environment. A non-exclusive list of examples include heads-up displays (HUDs), head mountable devices, projection-based devices, windows or vehicle windshields having integrated display capability, displays formed as lenses to be placed on users' eyes (e.g., contact lenses), headphones/earphones, input devices with or without haptic feedback (e.g., wearable or handheld controllers), speaker arrays, smartphones, tablets, and desktop/laptop computers. A head mountable device can have one or more speaker(s) and an opaque display. Other head mountable devices can be configured to accept an opaque external display (e.g., a smartphone). The head mountable device can include one or more image sensors to capture images/video of the physical environment and/or one or more microphones to capture audio of the physical environment. A head mountable device may have a transparent or translucent display, rather than an opaque display.

The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based devices can utilize retinal projection technology that projects images onto users' retinas. Projection devices can also project virtual objects into the physical environment (e.g., as a hologram or onto a physical surface).

FIG. 1 illustrates an electronic device 100 configurable to display a computer-generated environment according to some embodiments of the disclosure. In some embodiments, electronic device 100 is a portable electronic device, such as a tablet computer, laptop computer or a smartphone, among other possibilities. Example architectures of electronic device 100 are described in further detail with reference to FIGS. 2A-2B. FIG. 1 illustrates electronic device 100 and table 104A located in the physical environment 102. In some embodiments, electronic device 100 is configured to capture and/or display areas of physical environment 102 including table 104A (illustrated in the field of view of electronic device 100). In some embodiments, the electronic device 100 is configured to display one or more virtual objects in the computer-generated environment that are not present in the physical environment 102, but are displayed in the computer generated environment (e.g., positioned on or otherwise anchored to the top surface of a computer-generated representation 104B of real-world table 104A). In FIG. 1, for example, an object 106 not present in the physical environment (e.g., a virtual object) is displayed on the surface of the table 104B in the computer-generated environment displayed via device 100, optionally in response to detecting the planar surface of table 104A in the physical environment 102. It should be understood that object 106 is a representative object and one or more different objects (e.g., of various dimensionality such as two-dimensional or three-dimensional objects) can be included and rendered in a two-dimensional or a three-dimensional computer-generated environment. For example, the virtual objects can include an application or a user interface displayed in the computer-generated environment. Additionally, it should be understood, that the three-dimensional (3D) environment (or 3D object) described herein may be a representation of a 3D environment (or 3D object) displayed in a two dimensional (2D) context (e.g., displayed on a 2D display screen).

Figure 2A:
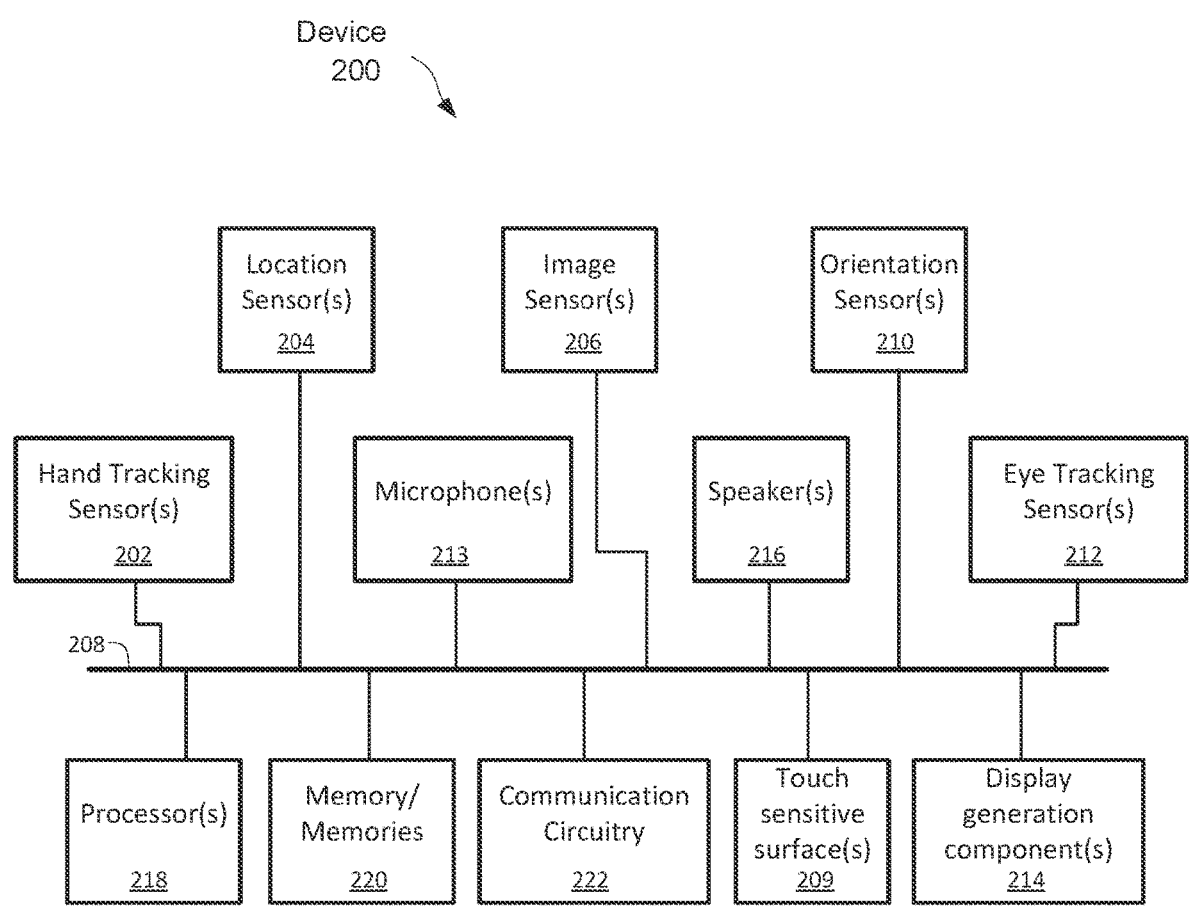
FIGS. 2A-2B illustrate block diagrams of exemplary architectures for a device or devices in accordance with some embodiments of the disclosure.
Figure 2B:
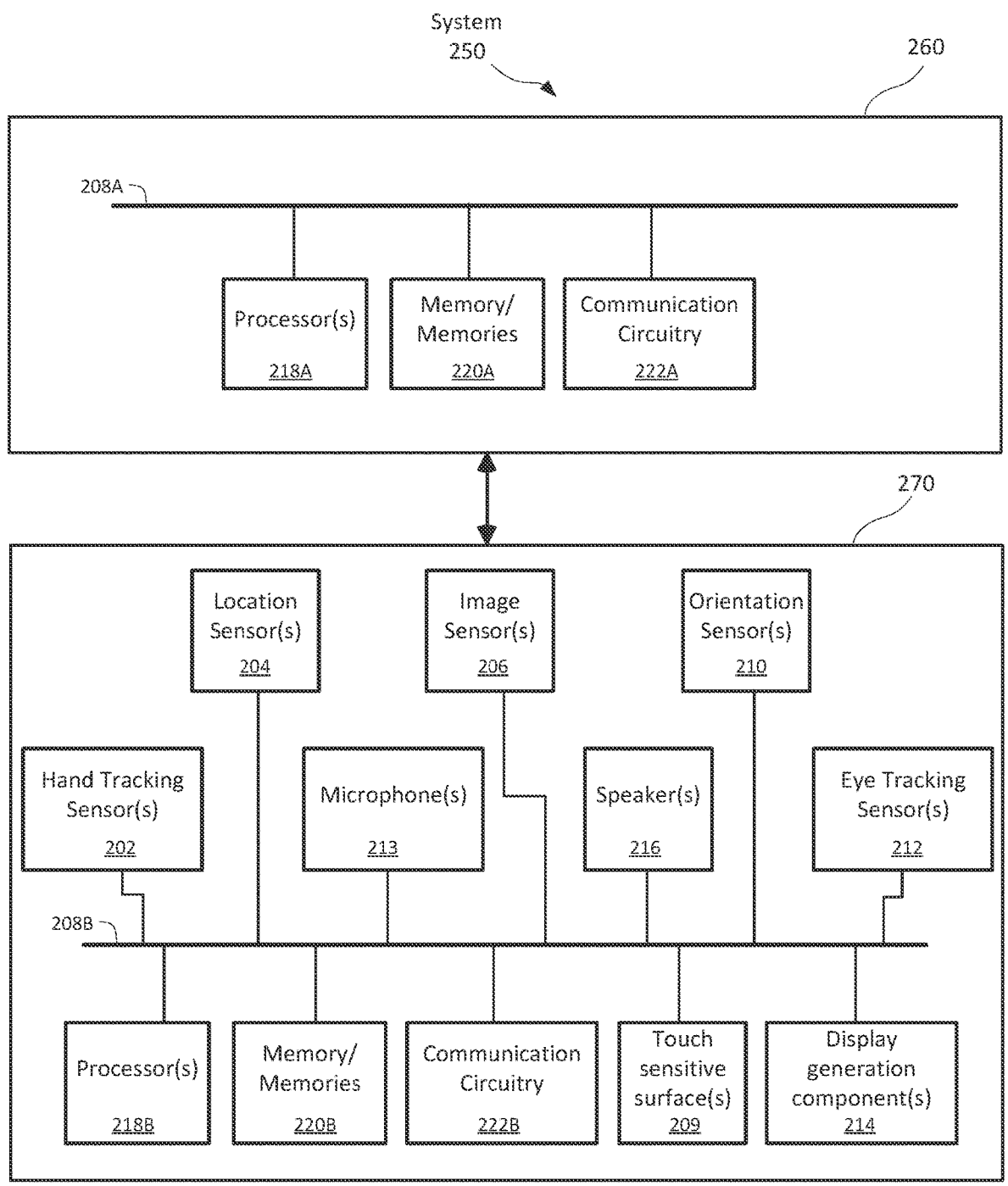

FIGS. 2A-2B illustrate example block diagrams of architectures for a device or devices in accordance with some embodiments of the disclosure. The blocks in FIG. 2A can represent an information processing apparatus for use in a device. In some embodiments, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222.

One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some embodiments, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some embodiments, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some embodiments, display generation component(s) 214 include multiple displays. In some embodiments, display generation component(s) 214 includes a display with a touch-sensitive surface (e.g., a touch screen), a projector, a holographic projector, a retinal projector, etc.

In some embodiments, device 200 includes touch-sensitive surface(s) 209 configured to receive user inputs (touch and/or proximity inputs), such as tap inputs and swipe inputs or other gestures. In some embodiments, display generation component(s) 214 and touch-sensitive surface(s) 209 together form touch-sensitive display(s) (e.g., a touch screen integrated with device 200 or external to device 200 that is in communication with device 200). It should be understood, that device 200 optionally includes or receives input from one or more other physical user-interface devices than a touch-sensitive surface, such as a physical keyboard, a mouse, a stylus and/or a joystick (or any other suitable input device).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 206 include a first image sensor and a second image sensor. The first image sensor and the second image sensor work together and are optionally configured to capture different information of physical objects in the real-world environment. In some embodiments, the first image sensor is a visible light image sensor and the second image sensor is a depth sensor. In some embodiments, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some embodiments, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, or head, more generally) with respect to the real-world or computer-generated environment and/or relative to the display generation component(s) 214. The user's gaze can include a direction in which the eyes are directed, and optionally intersection with a particular point or region of space and/or intersection with a particular object. In some embodiments, hand tracking sensor(s) 202 and/or eye tracking sensor(s) 212 are implemented together with the display generation component(s) 214 (e.g., in the same device). In some embodiments, the hand tracking sensor(s) 202 and/or eye tracking sensor(s) 212 are implemented separate from the display generation component(s) 214 (e.g., in a different device).

In some embodiments, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some embodiments, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and gaze can be determined from tracking both eyes. In some embodiments, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some embodiments, microphone(s) 213 includes an array of microphones that optionally operate together (e.g., to identify ambient noise or to locate the source of sound in space of the real-world environment). In some embodiments, audio and/or voice inputs can be used to interact with the user interface or computer-generated environment captured using one or more audio sensors (e.g., microphones), as permitted by the user of the electronic device.

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that device 200 is not limited to the components and configuration of FIG. 2A. For example, the device can include fewer, additional, or other components in the same or different configurations. In some embodiments, as illustrated in FIG. 2B, system 250 can be divided between multiple devices. For example, a first device 260 optionally includes processor(s) 218A, memory or memories 220A, and communication circuitry 222A, optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

Device 200 or system 250 typically support a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo/video management application, a digital camera application, a digital video camera application, a web browsing application, a digital music player application, a television channel browsing application, and/or a digital video player application.

A computer-generated environment may be displayed using an electronic device (e.g., electronic device 100, device 200, device 270), including using one or more display generation components. The computer-generated environment can optionally include various graphical user interfaces ("GUIs") and/or user interface objects.

In some embodiments, the electronic device can detect or estimate a lighting characteristic of the real world. The estimate of the lighting characteristic can provide some understanding of lighting in the environment. For example, the estimate of the lighting characteristic may provide an indication of which regions of the real-world environment are light or dark. The estimate of the lighting characteristic may provide an indication of the position of light sources (e.g., parametric light sources, directional light sources, point light sources, area light sources, etc.) and/or orientation of light sources. In some embodiments, the lighting characteristic is estimated as a per-voxel incident light field indicating brightness, color and/or direction. For example, the lighting characteristic can be parameterized as an image-based lighting (IBL) environment map. It should be understood that other parameterizations of the lighting characteristic are possible. In some examples, the lighting characteristic is estimated on a per pixel basis of using a triangle mesh with the lighting characteristic defining lighting for each vertex or for each face. Additionally, it should be understood that the estimate of the lighting characteristic is optionally derived from an intermediate representation (e.g., environment map).

In some embodiments, sensors such as cameras (e.g., image sensor(s) 206) are used to capture images of the real-world environment. The images can be processed by processing circuitry (one or more of processor(s) 218) to localize and measure light sources. In some embodiments, light can be determined from the reflections and or shadows cast by light sources in the environment. In some embodiments, deep learning (e.g., supervised) or other artificial intelligence or machine learning is used to estimate the lighting characteristic based on input image(s).

As described herein, a computer-generated environment including various graphics user interfaces ("GUIs") may be displayed using an electronic device, such as electronic device 100 or device 200, including one or more display generation components. The computer-generated environment can include one or more GUIs associated with an application. For example, a computer-generated environment can display a menu or selectable options to cause launching or display of user interfaces for applications in the computer-generated environment. Similarly, the computer-generated environment can display a menu or selectable options to perform operations with respect to applications that are running in the computer-generated environment.

Figure 3:
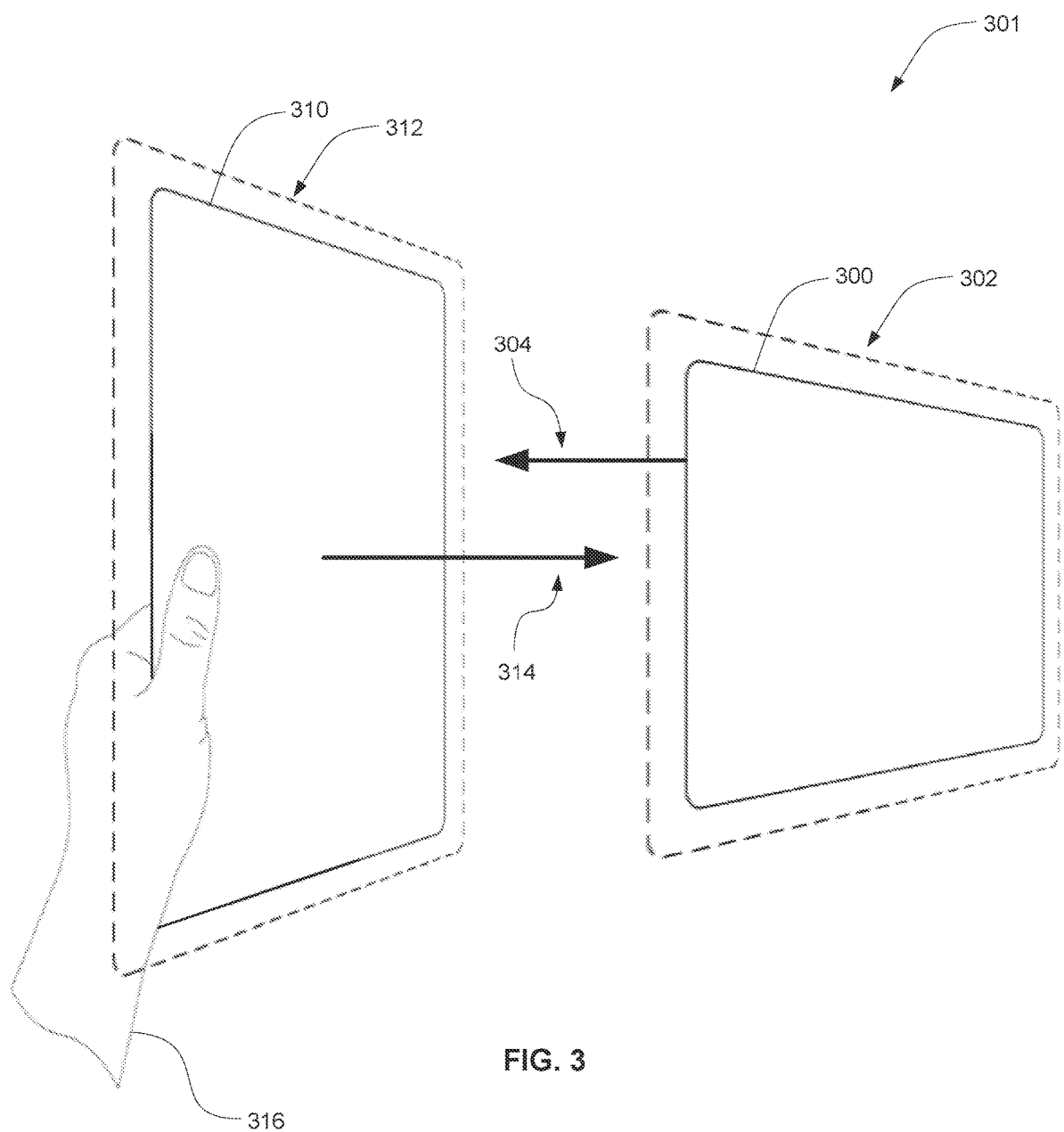
FIG. 3 illustrates a method of determining that a surface is facing an electronic device according to some embodiments of the disclosure.

FIG. 3 illustrates a method of determining that a surface 310 is facing electronic device 300. In FIG. 3, environment 301 is a physical environment that includes a user's hand 316, a surface 310, and electronic device 300 (e.g., such as device 100 or 200 described above). In some embodiments, hand 316 is holding surface 310 in front of electronic device 300. In some embodiments, surface 310 is a planar surface or substantially planar surface, such as a clipboard, a binder, a piece of paper, etc. In some embodiments, surface 310 is the palm of the user's hand 316 (e.g., hand 316 is open and facing toward electronic device 300). In some embodiments, surface 310 can be any substantially planar surface. In FIG. 3, surface 310 is facing electronic device 300. In some embodiments, surface 310 is facing electronic device 300 if the "normal" vector (e.g., a 90 degree angle extending directly outwards from surface 310, represented by arrow 314) is pointed toward device 300. In some embodiments, surface 310 is facing electronic device 300 if the "normal" angle is pointed within a hit zone 302 of electronic device 300. In some embodiments, hit zone 302 of electronic device 300 is an area that is equal to or larger than the area of electronic device 300 (e.g., 10% larger, 20% larger, 30% larger, etc.). In some embodiments, providing hit zone 302 that is larger than electronic device 300 allows the user a margin of error and does not require surface 310 to be perfectly angled towards electronic device 300. In some embodiments, hit zone 302 has a hysteresis effect, meaning that the size of hit zone 302 can increase when and in response to detecting that surface 310 is pointed within hit zone 302 (and decrease in size when surface 310 is not pointed within hit zone 302). In some embodiments, providing a hysteresis effect to hit zone 302 prevents small orientation changes of surface 310 from "jittering" (e.g., bouncing back and forth from being considered to be facing device 300 and not facing device 300).

As shown in FIG. 3, electronic device 300 is located in environment 301 and is facing surface 310. In some embodiments, electronic device 300 is facing surface 310 if a camera of electronic device 300 (e.g., a rear-facing camera, a back-facing camera) that is on one side of electronic device 300 (e.g., the back-side of the device, optionally the side opposite of the side with the display, the side other than the side with the display) is facing surface 310. In some embodiments, electronic device 300 is facing surface 310 if the camera of electronic device 300 is able to capture at least a threshold amount (e.g., 30%, 50%, 75%, 90%, etc.) or all of surface 310. In some embodiments, electronic device 300 is facing surface 310 if the "normal" angle of the device and/or of the camera of the device (the orientation of which is represented by arrow 304) is pointed within a hit zone 312 of surface 310. In some embodiments, hit zone 312 of surface 310 is an area that is larger than the area of surface 310 (e.g., 10% larger, 20% larger, 30% larger, etc.). In some embodiments, providing hit zone 312 that is larger than surface 310 allows the user a margin of error and does not require electronic device 300 to be perfectly angled towards surface 310. In some embodiments, hit zone 312 has a hysteresis effect, meaning that the size of hit zone 312 can increase when and in response to detecting that electronic device 300 is pointed within hit zone 312 (and decrease in size when electronic device 300 is not pointed within hit zone 312). In some embodiments, providing a hysteresis effect to hit zone 312 prevents small orientation changes of electronic device 300 from "jittering" (e.g., bouncing back and forth from being considered to be facing surface 310 and not facing surface 310).

In some embodiments, electronic device 300 is a head-mounted device and arrow 304 represents the direction of the gaze of the user (e.g., such that in FIG. 3, the gaze of the user is directed at surface 310), instead of a camera of device 300 as described above. Thus, the gaze of the user is directed to surface 310 if the direction of the gaze of the user (e.g., that is captured by the one or more eye tracking sensors) is pointed within hit zone 312.

As will be described in more detail below, in accordance with a determination that one or more criteria are satisfied, device 300 can display, via a display generation component, one or more selectable options (e.g., a menu user interface, a control user interface element, a control element, etc.). In some embodiments, the one or more criteria additionally or alternatively includes a criterion that is satisfied when surface 310 is facing electronic device 300. In some embodiments, the one or more criteria additionally or alternatively include a criterion that is satisfied when electronic device 300 is facing surface 310. In some embodiments, the one or more criteria additionally or alternatively include a criterion that is satisfied when a gaze of the user is directed to surface 310.

In some embodiments, surface 310 is the palm of a hand and the one or more criteria additionally or alternatively include a criterion that is satisfied when the hand is open (e.g., such that the palm is viewable and can act as a surface on or near which the selectable options are displayed). For example, if the hand of the user is not open, the device can determine that there is no surface on which to display selectable options and thus the one or more criteria are not satisfied (e.g., there is no surface that is facing the device). In some embodiments, the one or more criteria includes any combination of criterion and any number of criterion. For example, the one or more criteria can include the criterion that is satisfied when the hand is open (e.g., the surface is planar), the criterion that is satisfied when the hand (e.g., the surface) is oriented in a predetermined manner with respect to electronic device 300, the criterion that is satisfied when the hand is facing a direction that is within a threshold number of degrees of a vector pointing from the hand to a user of the electronic device, the criterion that is satisfied when a predetermined pose of the hand is detected by an image sensor, and/or the criterion that is satisfied when the gaze of the user is directed to the hand. In some embodiments, the one or more criteria include a criterion that is satisfied when the device detects a gesture by the hand that includes causing the palm of the hand to be open and facing the device. For example, the one or more criteria is satisfied if the device detects that the hand is initially facing away from the device (e.g., the back of the hand is facing toward the device), and rotates such that the palm is facing towards the device. In another example, the one or more criteria is satisfied if the device detects that the hand is initially facing the device holding a first gesture and then opens such that the palm is opened and facing the device. Thus, in some embodiments, the one or more criteria includes a requirement that the user perform a predetermined gesture to cause the palm of the hand to be facing towards the device (e.g., a rotation gesture or a first opening gesture).

It is understood that in the examples described below, the selectable options may be displayed in accordance with a determination that the criteria described herein are satisfied. In some embodiments, in response to and/or in accordance with a determination that the criteria not being satisfied, device 300 forgoes displaying the selectable options (e.g., ceases display of the selectable options).

Figure 4A:
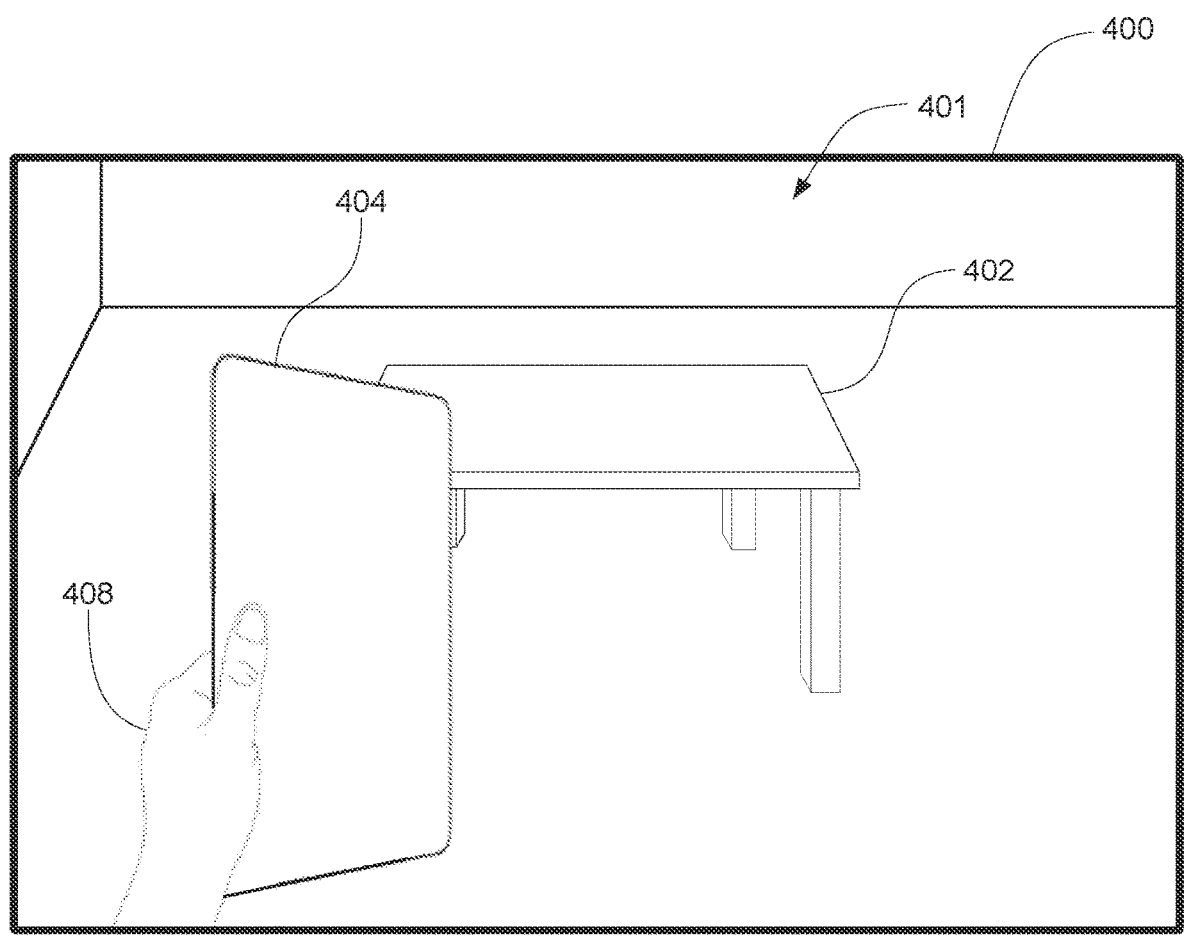
FIGS. 4A-4D illustrate methods of displaying selectable options on a surface according to some embodiments of the disclosure.

FIGS. 4A-4D illustrate methods of displaying selectable options on surface 404 according to some embodiments of the disclosure. In FIG. 4A, electronic device 400 (e.g., similar to electronic device 100, 200 and/or 300 described above) is displaying a computer-generated environment 401 (e.g., a computer generated environment). As described above, computer-generated environment 401 can include representations of objects that are in the physical world around electronic device 400 (e.g., that are captured by one or more cameras of electronic device 400 or are permitted to be viewable to user via a transparent or translucent display). For example, computer-generated environment 401 includes table 402, surface 404 and hand 408. In some embodiments, table 402, surface 404, and hand 408 are representations of a table, surface, and hand that is in the physical environment around electronic device 400 that one or more capture devices of electronic device 400 is able to capture. For example, hand 408 is the hand of the user of the electronic device and is holding surface 404 (e.g., a clipboard, a paper, a board, the palm of hand 408, etc.), which is a real world object in the physical world around electronic device 400. In some embodiments, device 400 captures an image of the hand of the user using one or more cameras of device 400 and displays hand 408 in three dimensional environment 401. In some embodiments, hand 408 is a photorealistic depiction of the hand of the user or a caricature or outline of the hand of the user (e.g., hand 408 is a representation of a hand of the user). In some embodiments, device 400 passively presents hand 408 via a transparent or translucent display and permits hand 408 to be viewable, for example, by not actively displaying a virtual object that obscures the view of hand 408. As used herein, reference to a physical object such as hand can refer to either a representation of that physical object presented on a display, or the physical object itself as passively provided by a transparent or translucent display. In some embodiments, computer-generated environment 401 can display one or more virtual objects (e.g., objects that are generated and displayed by device 400 in computer-generated environment 401, but do not exist in the physical environment (e.g., real world environment) around device 400.

In some embodiments, device 400 can display one or more selectable options (e.g., a menu user interface, a control user interface element, a control element, etc.) on surface 404 in response to determining that one or more criteria are satisfied. In some embodiments, the one or more criteria includes a criterion that device 400 is facing surface 404 and/or a criterion that surface 404 is facing device 400. In FIG. 4A, hand 408 is holding surface 404 at a location in the physical world such that the one or more cameras of electronic device 400 is able to capture at least some or all of surface 404. Thus, in some embodiments, the one or more cameras of device 400 is determined to be facing surface 404 and the criterion that device 400 be facing surface 404 is satisfied. In FIG. 4A, surface 404 is facing towards the right of device 400 (e.g., not facing directly towards device 400) such that surface 404 is facing outside of the hit zone of device 400. Thus, in FIG. 4A, the criterion that surface 404 be facing device 400 is not satisfied. In some embodiments, because the criterion that surface 404 be facing device 400 is not satisfied, device 400 does not display one or more selectable options on surface 404.

Figure 4B:
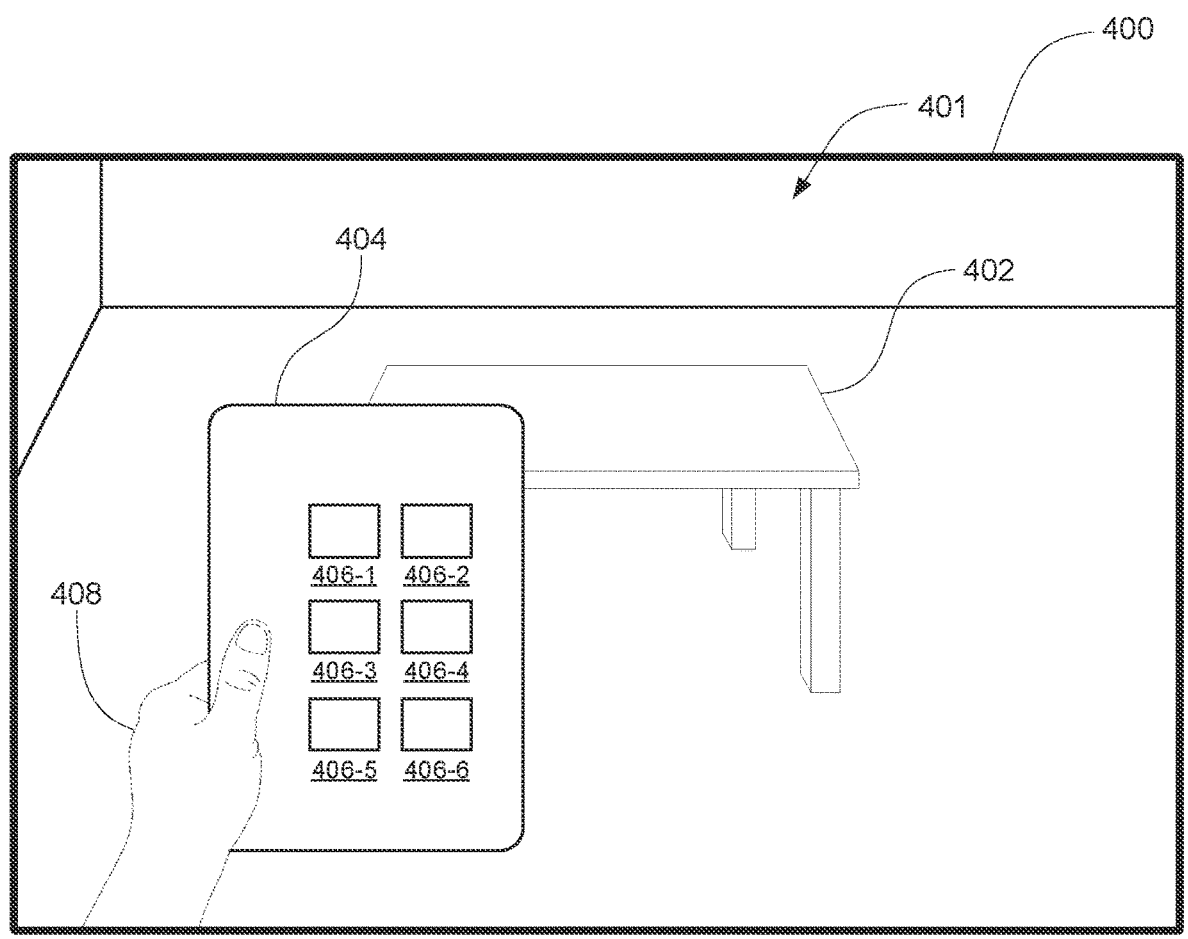

FIG. 4B illustrates an embodiment in which hand 408 has rotated such that surface 404 is now facing device 400 (e.g., the "normal" angle of surface 404 is pointed within the hit zone of device 400). Thus, in FIG. 4B, the criterion that surface 404 be facing device 400 is satisfied. In response to determining that both the criterion that device 400 be facing surface 404 is satisfied and the criterion that surface 404 be facing device 400 is satisfied, device 400 displays selectable options 406 (e.g., selectable options 406-1 to 406-6) on surface 404. In some embodiments, displaying selectable options 406 includes displaying selectable options 406 at a location in three-dimensional environment 401 such that the selectable options 406 appear to be on the surface of surface 404. In some embodiments, selectable options 406 are displayed such that they appear to be hovering above surface 404 (e.g., above surface 404 by 1 cm, 1 inch, 2 inches, etc.).

As shown in FIG. 4B, device 400 is displaying selectable options 406-1 to 406-6 (e.g., buttons) on or near surface 404. In some embodiments, selectable options 406-1 to 406-6 correspond to an application launching menu (e.g., a control user interface element) in which selection of selectable options 406-1 to 406-6 cause the launching and/or display of a respective application in three-dimensional environment 401 (e.g., display of a user interface of a respective application). In some embodiments, selectable options 406-1 to 406-6 are representations of respective applications and include icons, images, short videos, animations, or other graphics representative of the respective application.

In some embodiments, after displaying selectable options 406 on surface 404, selectable options 406 are dismissed (e.g., ceased to be displayed) in response to detecting and/or determining that the one or more criteria for displaying the selectable options is no longer satisfied. For example, if hand 408 rotates such that surface 404 is no longer facing device 400, then selectable options 406 are removed from display.

In some embodiments, selectable options 406 can include any number of options and are not limited to only those illustrated herein. In some embodiments, selectable options 406 can include a plurality of "tabs" or "pages" of selectable options such that a user can perform a leftward or rightward swipe gesture (optionally while performing a pinch gesture using any two fingers, such as a thumb and forefinger) using a hand of the user (e.g., a hand other than the hand on which the selectable options are displayed or a hand other than the hand that is holding the surface on which the selectable options are displayed) to cause the display of the next set of selectable options. For example, selectable options 406-1 through 406-6 may correspond to the first set (e.g., the first "page"), and in response to a rightward or leftward swipe, device 400 can replace display of selectable options 406-1 through 406-6 with another set of selectable options (e.g., corresponding to another "page" of options).

As discussed above, surface 404 can be any type of surface, optionally presented by hand 408. For example, surface 404 can be the palm of hand 408 such that if the palm of hand 408 is facing device 400, selectable options 406 are displayed on or near the palm of hand 408. It is also understood that selectable options 406 are not limited to options for launching applications and can be any type of selectable option, such as options for displaying a sub-menu, options for changing system settings, options for causing display of user interfaces, options for changing the visual characteristics of three-dimensional environment 401, etc. In addition, selectable options 406 need not be "buttons" and can also be manipulable control elements, such as knobs, dials, slider bars, etc.

Figure 4C:
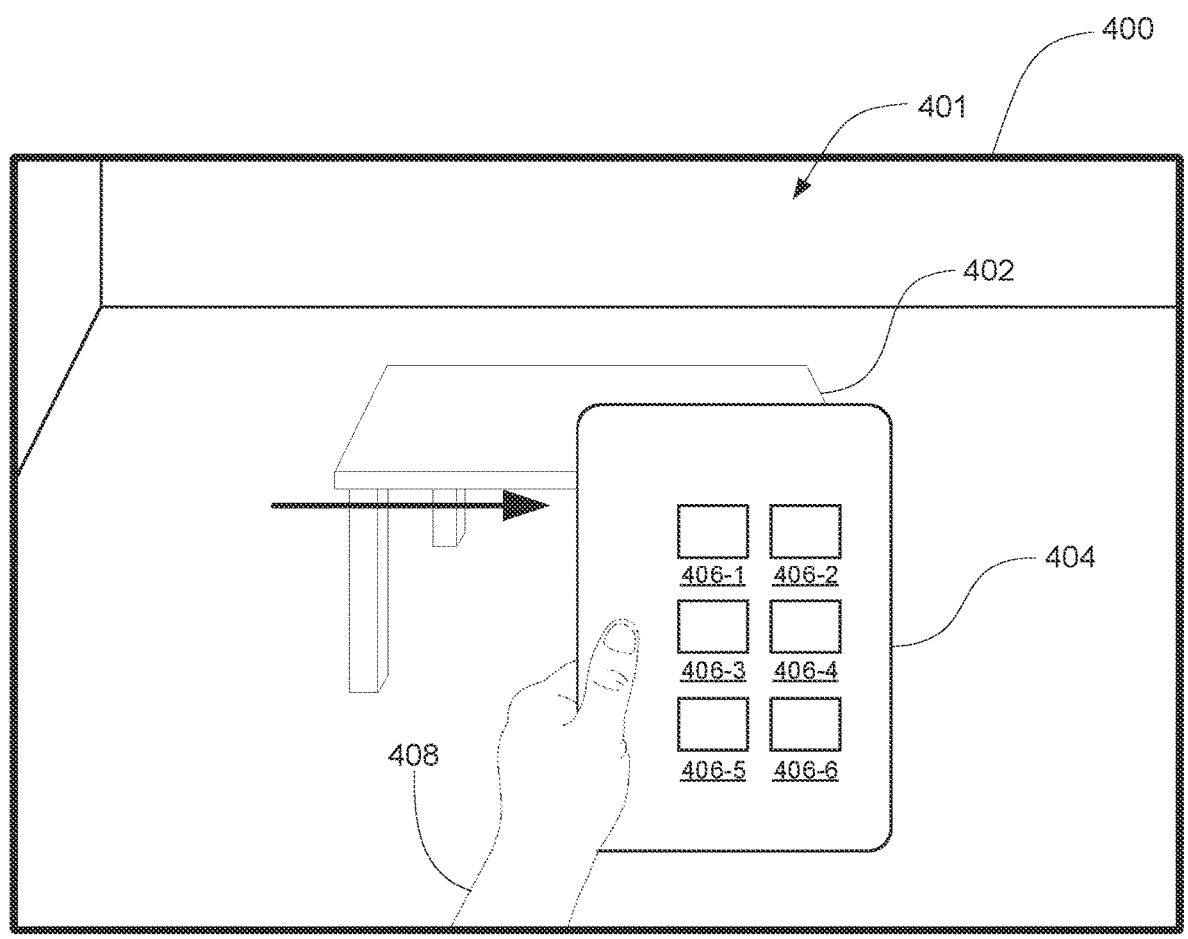

In FIG. 4C, device 400 detects that surface 404 has moved in the physical environment (e.g., due to the movement of hand 408) such that surface 404 has moved rightwards in three-dimensional environment 401 to a different location. In some embodiments, in response to detecting the movement of surface 404 and while detecting the movement of surface 404, device 400 moves selectable options 406 to maintain its relative position in three-dimensional environment 401 with respect to surface 404. For example, in FIG. 4C, selectable options 406 have moved rightwards to "follow" surface 404, such that selectable options 406 remain displayed at or near surface 404. Thus, a user is able to move surface 404 around three-dimensional environment 401 and selectable options 406 follow surface 404 and remain displayed at or near surface 404 (e.g., while the one or more criteria remain satisfied).

In some embodiments, selectable options 406 display an inertia effect in which the movement of selectable options 406 may lag the movement of surface 404, accelerate, and then catch up to surface 404. For example, in FIG. 4C, as surface 404 moves rightwards, selectable options 406 may move rightwards at a slower speed than the speed of the rightward movement of surface 404. As surface 404 continues to move rightwards, the speed of the rightward movement of selectable options 406 may increase (e.g., accelerate) such that selectable options 406 can catch up to surface 404 and resume their original relative positions on surface 404.

In some embodiments, individual selectable options of selectable options 406 can exhibit the inertial effect such that the options that are closer to the direction of the movement have a different movement behavior than options that are farther from the direction of the movement. For example, in FIG. 4C, selectable options 406-2, 406-4, and 406-6, which are the options on the right side (e.g., closer to the direction of the movement), move rightwards earlier and/or faster than selectable options 406-1, 406-3, and 406-5, and/or accelerate at a different rate than selectable options 406-1, 406-3, and 406-5.

Figure 4D:
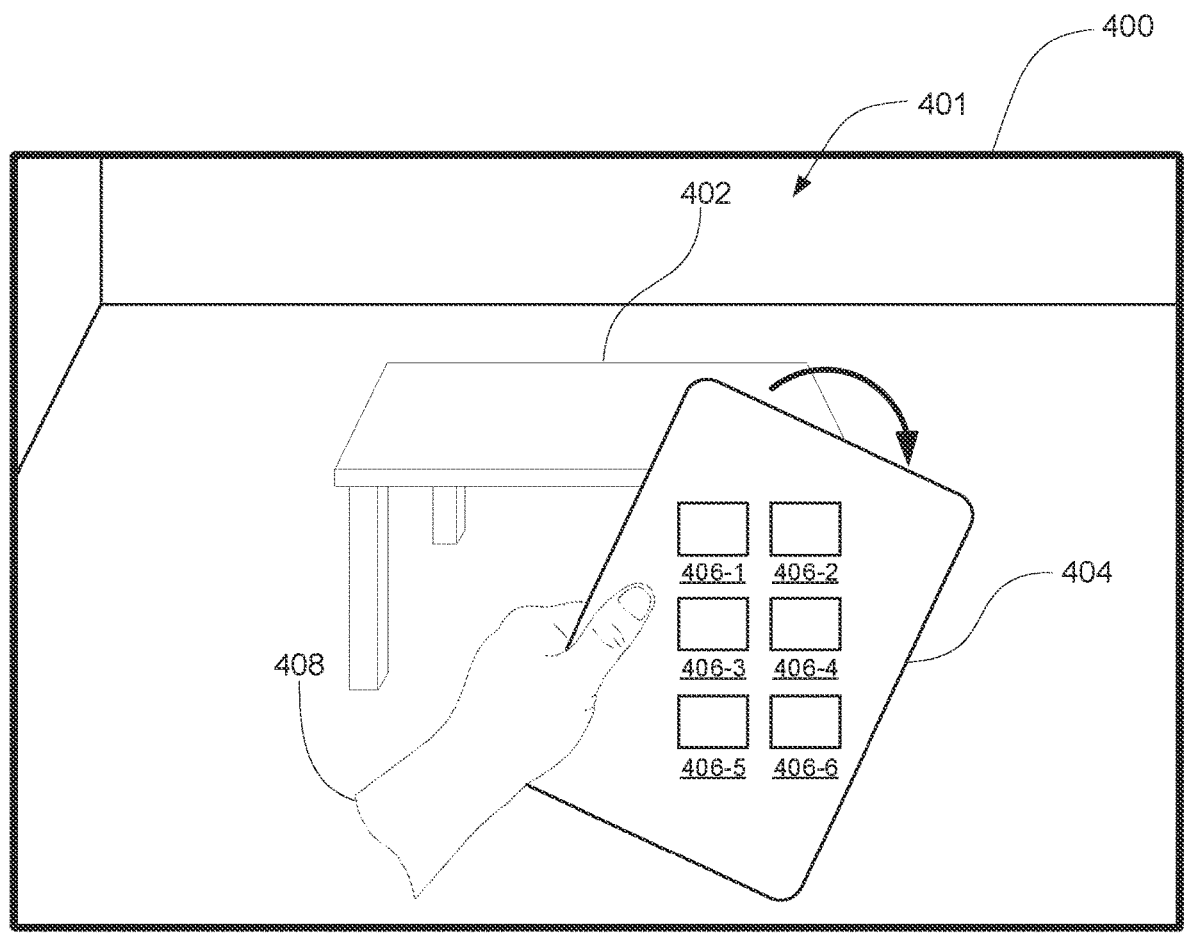

In FIG. 4D, device 400 detects that surface 404 has rotated such that surface 404 is no longer oriented "upwards" in three-dimensional environment 401 (e.g., surface 404 is now diagonally angled). In some embodiments, despite surface 404 rotating, device 400 maintains the orientation of selectable options 406, as shown in FIG. 4D. For example, selectable options 406 are still displayed in the same orientation as when surface 404 was oriented upwards and the selectable options 406 are still arranged in the same way as when surface 404 was oriented upwards. In some embodiments, selectable options 406 are oriented in a direction based on the orientation of the environment, the orientation of hand 408, the orientation of device 400, and/or the orientation of surface 404. For example, device 400 can determine, based on objects in the environment and/or one or more sensors in device 400 (e.g., gyroscopic sensors, etc.) which direction is "up" and which direction is "down" (e.g., up or down with respect to the earth, the floor, the environment, the direction of gravity, and/or down with respect to the direction that the device is facing). Thus, based on the determination of the "up" and "down" directions of three-dimensional environment 401, device 400 can display selectable options 406 such that they are oriented in the up-and-down directions (e.g., without any rotation with respect to three-dimensional environment 401). Thus, as shown in FIG. 4D, rotation of surface 404 does not cause a similar rotation of selectable options 406.

In some embodiments, selectable options 406 do rotate in response to the rotation of surface 404. For example, selectable options 406 can rotate such that each selectable option is maintained at its relative position on surface 404, but continues to be facing "upwards" (e.g., the arrangement of icon shifts, but the orientation of the icons themselves don't rotate). In some embodiments, both the arrangement of icons and the orientation of the icons can rotate in accordance with the rotation of surface 404. In some embodiments, the rotation of selectable options 406 can be a scaled amount of the rotation of surface 404 such that selectable options 406 do not rotate as much as surface 404 (e.g., a 30° rotation of surface 404 results in a 15° rotation of the selectable options 406). For example, selectable options 406 can rotate slightly in response to the rotation of surface 404 to provide visual feedback that surface 404 is rotating, but not enough to cause large or sudden changes to the positioning of selectable options 406 (e.g., which can make it difficult for the user to select). In some embodiments, the scaling is fixed or dynamic (e.g., scaling factor changes such that the amount of relative rotation decreases). In some embodiments, the amount of rotation on selectable options 406 can be capped (e.g., capped at 0° of rotation, 20° of rotation, 30° of rotation, 45° of rotation, etc.) such that if surface 404 rotates by more than a certain amount, selectable options 406 stop rotating and be maintained at the maximum angle of rotation. In some embodiments, selectable options 406 can provide a "rubber banding" effect such that when the selectable options reach their maximum rotation value, in response to further rotation by surface 404, selectable options 406 will rotate slightly beyond its maximum value (e.g., 1°, 3°, 5°, 10°, etc.), but return to the maximum rotation value when the surface 404 stops rotating.

Figure 5:
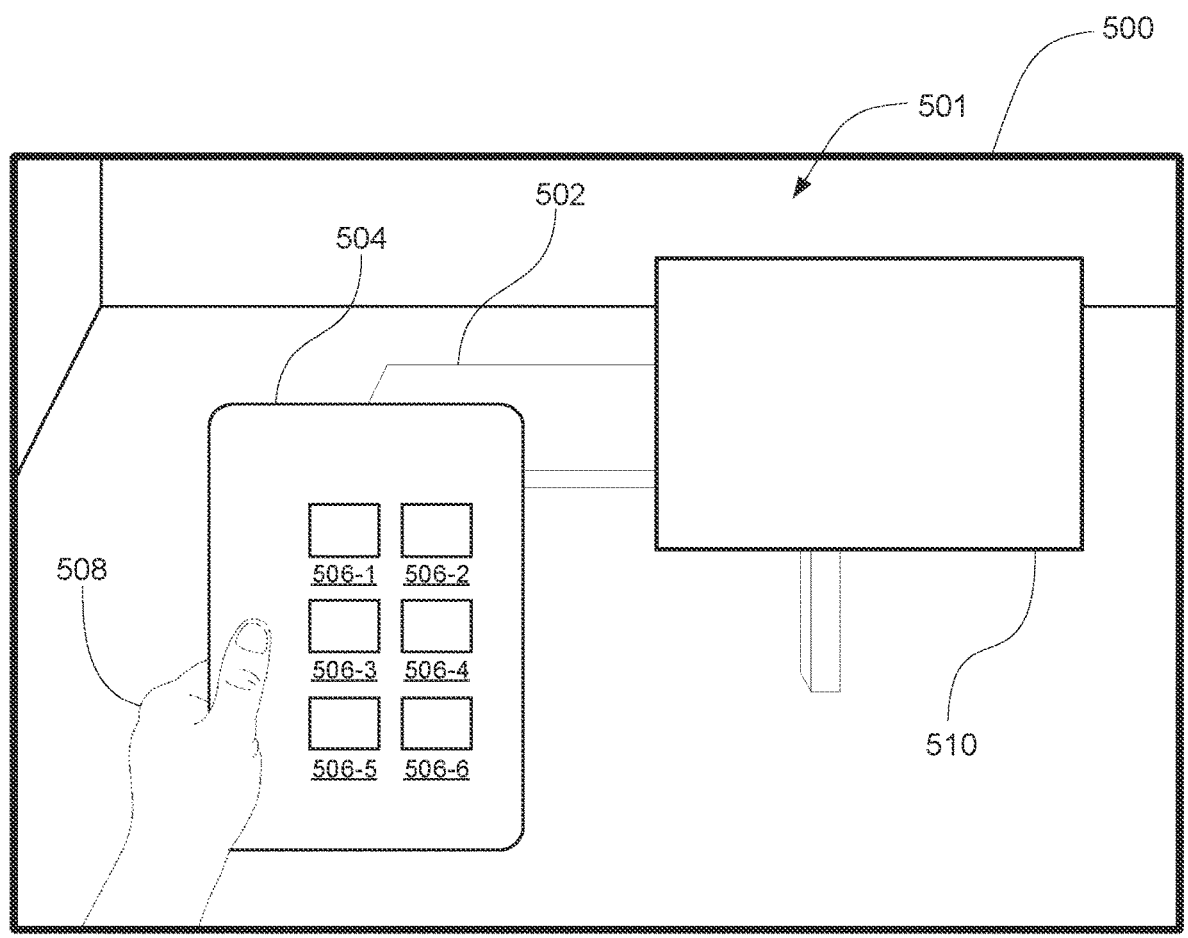
FIG. 5 illustrates a method of displaying selectable options on a surface associated with an application according to some embodiments of the disclosure.

FIG. 5 illustrates a method of displaying selectable options on surface 504 associated with application 510 according to some embodiments of the disclosure. In FIG. 5, device 500 is displaying a user interface of application 510 in three-dimensional environment 501. In some embodiments, three-dimensional environment 501 is similar to three-dimensional environment 401 described above (e.g., including table 502). In some embodiments, application 510 is displayed in response to selecting a selectable option, such as one of selectable options 406 on surface 404 (as will be described in more detail below with respect to FIGS. 6, 7, and 8A-8B). In some embodiments, in accordance with a determination that application 510 is displayed in three-dimensional environment 501 (and optionally in accordance with a determination that the one or more criteria described above are satisfied), device 500 displays selectable options 506 associated with application 510 (e.g., selectable options 506-1 to 506-6 are options that are selectable to perform an operation associated with application 510). For example, if application 510 is a media player application that is playing media, selectable options 506-1 to 506-6 can be options for controlling the media playback (e.g., pause, rewind, fast forward, etc.).

In some embodiments, surface 504 displays selectable options associated with application 510 (e.g., as opposed to selectable options for launching applications as described in FIGS. 4A-4D or selectable options associated with another application) in accordance with a determination that application 510 has the current focus. In some embodiments, application 510 has the current focus if device 500 determines that the gaze of the user is directed at application 510 (e.g., looking at application 510). In some embodiments, application 510 has the current focus if the user's most recently interaction was with application 510 (e.g., within a certain time threshold, such as 10 seconds, 30 seconds, 1 minute, 5 minutes, 10 minutes, etc.). For example, if the user has performed an operation associated with application 510 or selected a selectable option associated with application 510, then application 510 is considered to have focus (e.g., for a threshold amount of time, optionally until the gaze of the user is directed to another application).

In some embodiments, the device can implement a "dwell time" for a user's gaze. For example, for the device to determine that a user's gaze is directed to a particular object or position, the user's gaze may need to remain at the object or position for more than a threshold amount of time (e.g., 0.5 seconds, 1 second, 3 seconds, etc.). In some embodiments, additionally or alternatively, after a user's gaze moves away from a particular object or position, the device can still interpret the user's gaze as being directed to the object or position that the user was previously looking at for a threshold amount of time, such as 0.5 seconds, 1 second, 3 seconds, etc. Thus, in some embodiments, implementing a dwell time or otherwise dampening the interpretation of the user's gaze can prevent quick and unintentional movements of the user's eyes from causing unexpected results. In some embodiments, this "dwell time" can also be implemented when determining whether or not the one or more criteria are satisfied for displaying the selectable options discussed above with respect to FIGS. 4A-4D. In some embodiments, the "dwell time" can be prematurely terminated if the device determines that the user's gaze is directed to another object or application (optionally if the user's gaze is directed to another object or application for a threshold amount of time).

In some embodiments, after application 510 no longer has the current focus (e.g., after the user stops looking at application 510, after the user stops interacting with application 510, after the user begins looking at another application, etc.), device 500 ceases display of selectable options 506 and optionally replaces display of selectable options 506 with options that are not associated with application 510 (e.g., options for launching applications or options associated with another application). In some embodiments, device 500 continues to display selectable options 506 associated with application 510 (e.g., even after application 510 no longer has the current focus) until the user performs an input or gesture to dismiss selectable option 506 (e.g., the user moves hand 508 such that surface 504 is no longer facing device 500). In such embodiments, if the user performs an input or gesture to cause selectable options to be re-displayed on surface 504 (e.g., the user moves hand 508 such that surface 504 is facing device 500 again), then the selectable options can be options associated with another application (e.g., if the user is looking at another application), options associated with application 510 (e.g., if the user is still looking at application 510), or options not associated with a particular application, such as options for launching applications (e.g., if the user is not looking at a particular application). Thus, in some embodiments, the selectable options displayed on surface 504 can be "sticky" and are fixed when the selectable options are initially displayed and do not change until the next time selectable options are displayed on surface 504 (e.g., after dismissal). In some embodiments, the selectable options displayed on surface 504 are dynamic and change based on the application that has current focus.

In some embodiments, while selectable options are displayed in a three-dimensional environment, a user is able to activate (e.g., execute) a selectable option by performing a gesture or a plurality of gestures with one or more hands of the user. In some embodiments, interactions with a selectable option can be categorized as direct manipulation interactions and indirect manipulations interactions. A direct manipulation interaction can include moving a hand to a position such that the hand is able to directly interact with a selectable option (e.g., the hand is at a position such that the hand appears to be touching the selectable option in the three-dimensional environment, or within a threshold distance from the selectable option). An indirect manipulation interaction can include manipulating a selectable option by performing a gesture or plurality of gestures with one or both hands of the user while the gaze of the user is directed to a particular selectable option (optionally while the hand of the user is farther than the threshold distance from the selectable option). Thus, a user is able to interact with a selectable option via indirect manipulation without requiring the user to reach out for a respective selectable option. As described above, directly manipulating a selectable option or indirectly manipulating a selectable option provides the device with an indication of which selectable option the user is requesting to manipulate (e.g., which selectable option has been selected by the user).

In some embodiments, execution of a particular selectable option is performed in response to detecting a particular gesture or plurality of gestures by one or both hands of the user. In some embodiments, the same gesture(s) are recognized as requests to execute the selectable option, without regard to whether the manipulation was direct or indirect. In some embodiments, different gestures are required to cause execution of a selectable option when the manipulation is direct as opposed to indirect. In some embodiments, a request to execute the selected selectable option includes a pinching gesture (optionally without requiring any other gesture other than the pinching gesture). In some embodiments, a request to execute the selected selectable option includes a pinching gesture followed by a movement of the hand releasing the selectable option (e.g., releasing the option upwards, releasing the option forwards, tossing or throwing the selectable option into the air or forward, etc.). In some embodiments, a request to execute the selected selectable option includes a tapping gesture by a finger. In some embodiments, a request to execute the selected selectable option includes a pointing gesture by a finger (e.g., optionally for more than a threshold amount of time, such as 0.5 seconds, 1 second, 3 seconds, 5 seconds, etc.). In some embodiments, the selected selectable option is executed in response to detecting the pinching gesture. In some embodiments, the selectable option is executed in response to detecting a release of the pinching gesture (e.g., after detecting the movement of the hand while maintaining the pinching gesture and then releasing the pinching gesture).

Figure 6:
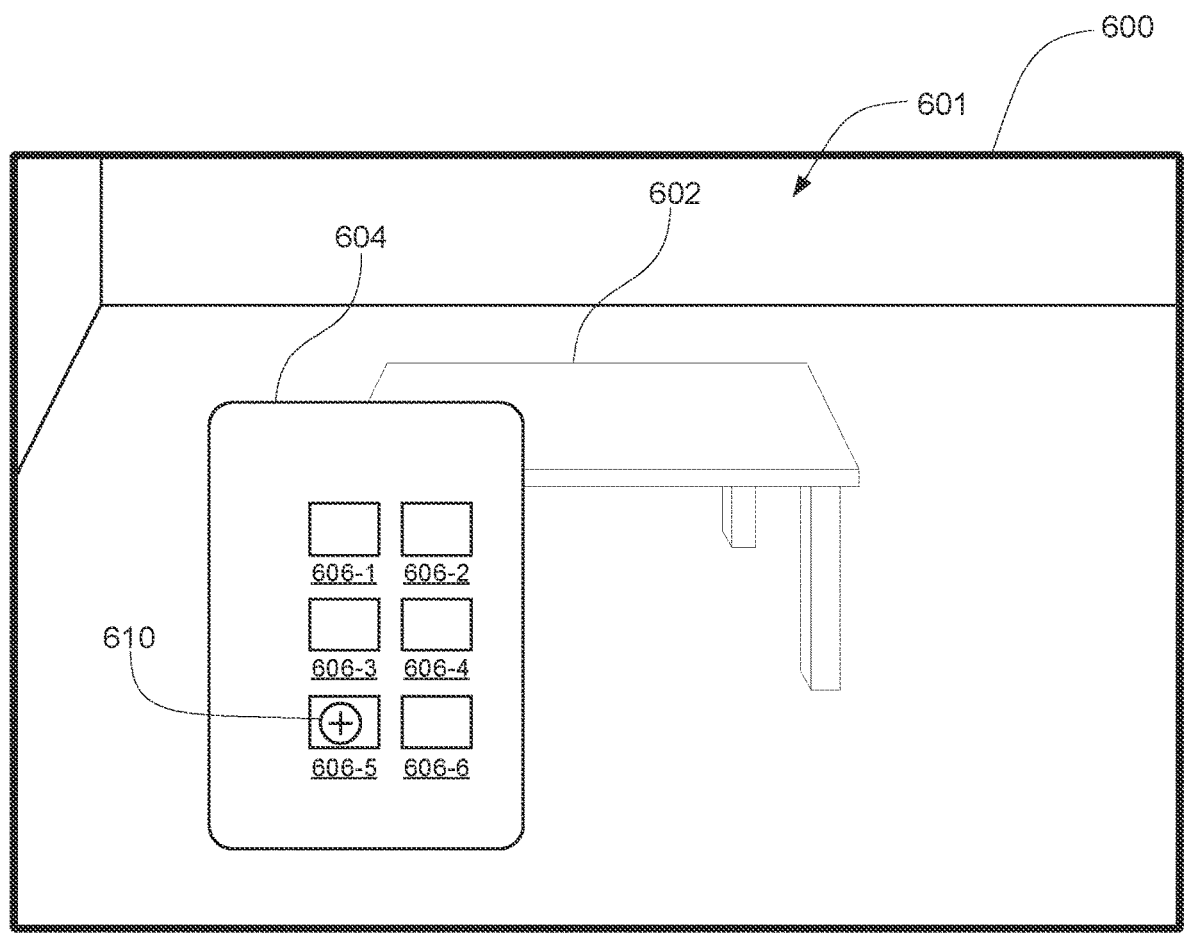
FIG. 6 illustrates a method of selecting a selectable option according to some embodiments of the disclosure.
Figure 6:
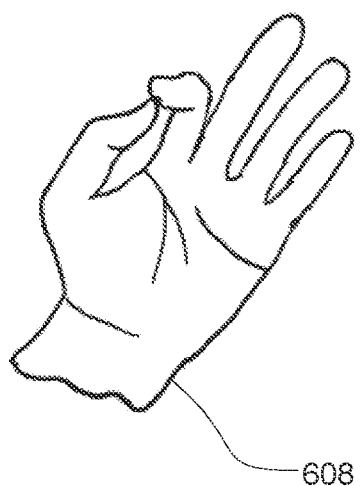

FIG. 6 illustrates a method of selecting a selectable option according to some embodiments of the disclosure. In FIG. 6, electronic device 600 is displaying three-dimensional environment 601, similar to three-dimensional environments 401 and 501, including table 602. In FIG. 6, while device 600 is displaying selectable options 606 on surface 604 (e.g., selectable options 606-1 to 606-6), device 600 detects a gesture performed by hand 608 (e.g., the hand of a user) corresponding to a request to execute the selected selectable option while gaze 610 of the user is directed to selectable option 606-5. In some embodiments, hand 608 is visible in three-dimensional environment 601. In some embodiments, hand 608 is not visible in three-dimensional environment 601 but its position and/or orientation is tracked via a hand tracking device. In some embodiments, hand 608 is a different hand than the hand that is holding surface 604. In some embodiments, hand 608 is the same hand as the hand that is holding surface 604 (e.g., the user placed surface 604 on a tripod). In some embodiments, surface 604 is the palm of hand 608 and selectable options 606 are displayed on the palm of the user's hand 608 and while the user's gaze 610 is directed at selectable option 606-5, the user performs a respective gesture corresponding to a selection command. In some embodiments, the respective gesture is a pinch gesture between the thumb and forefinger of hand 608. In some embodiments, the respective gesture is a pointing gesture, or a flicking gesture. In some embodiments, the respective gesture can be any other gesture predetermined to correspond to a request to execute the selected selectable option. In some embodiments, in response to detecting the gesture corresponding to the request to execute the selected selectable option while gaze 610 is directed at selectable option 606-5, device 600 executes an operation associated with selectable option 606-5. For example, the launching or display of an application, or performance of an operation associated with an application.

In some embodiments, device 600 determines that the user is gazing at selectable option 606-5 if the gaze of the user is focused within the boundary of selectable option 606-5 or within a threshold distance from selectable option 606-5 (e.g., within 1 cm, 1 inch, 6 inches, etc.). In some embodiments, a selectable option can have a "hit box" that exhibits a hysteresis effect, similar to the hit boxes described above in FIG. 3 with respect to device 300 and surface 310.

In some embodiments, in response to determining that the gaze 610 of the user is directed to a selectable option (e.g., selectable option 606-5), the electronic device can visually emphasize or distinguish the respective selectable option as compared to the other selectable options that the user is not gazing at. For example, in FIG. 6, selectable option 606-5 can be displayed larger, highlighted, or otherwise visually emphasized. Thus, the device is able to indicate which selectable option will be executed if the user were to perform a selection gesture.

In some embodiments, in response to detecting that gaze 610 is directed to selectable option 606-5, the device can display one or more textual descriptions of the selectable option. For example, the device can display the name or label of selectable option 606-5 below selectable option 606-5. In some embodiments the device can display the name or label of all of the selectable options, below their respective selectable options. Thus, in some embodiments, the device minimizes the visual clutter until the user indicates an interest in the selectable options, at which point, additional descriptive information is provided to identify the selectable options.

Thus, as shown in FIG. 6, a user is able to execute or otherwise select a selectable option 606-5 using the same hand that caused selectable options 606 to be displayed. In some embodiments, other methods of selecting selectable options 606 are possible. For example, a user is able to use a hand other than the hand holding surface 604 (e.g., the user's right hand, for example) to select a selectable option. In some embodiments, a user is able to use a hand to perform a gesture at a location in the physical environment associated with a selectable option in the three-dimensional environment 601. For example, a user is able to reach over with his or her right hand and perform a pinch gesture such that in three-dimensional environment 601, it appears as if the user is pinching a selectable option with the right hand, to cause performance of an operation associated with the selectable option (e.g., a direct manipulation pinch gesture).

In some embodiments, after receiving the input to select a selectable option and/or in response to executing a respective selectable option, the device ceases display of selectable options 606. For example, in response to the user selection, the device can launch an application and cease display of the selectable options (until the device detects that the one or more criteria for causing display of the selectable options are again satisfied). In some embodiments, the selectable options 606 remain displayed after selection of a selectable option (e.g., such that the user is able to further select options).

Figure 7:
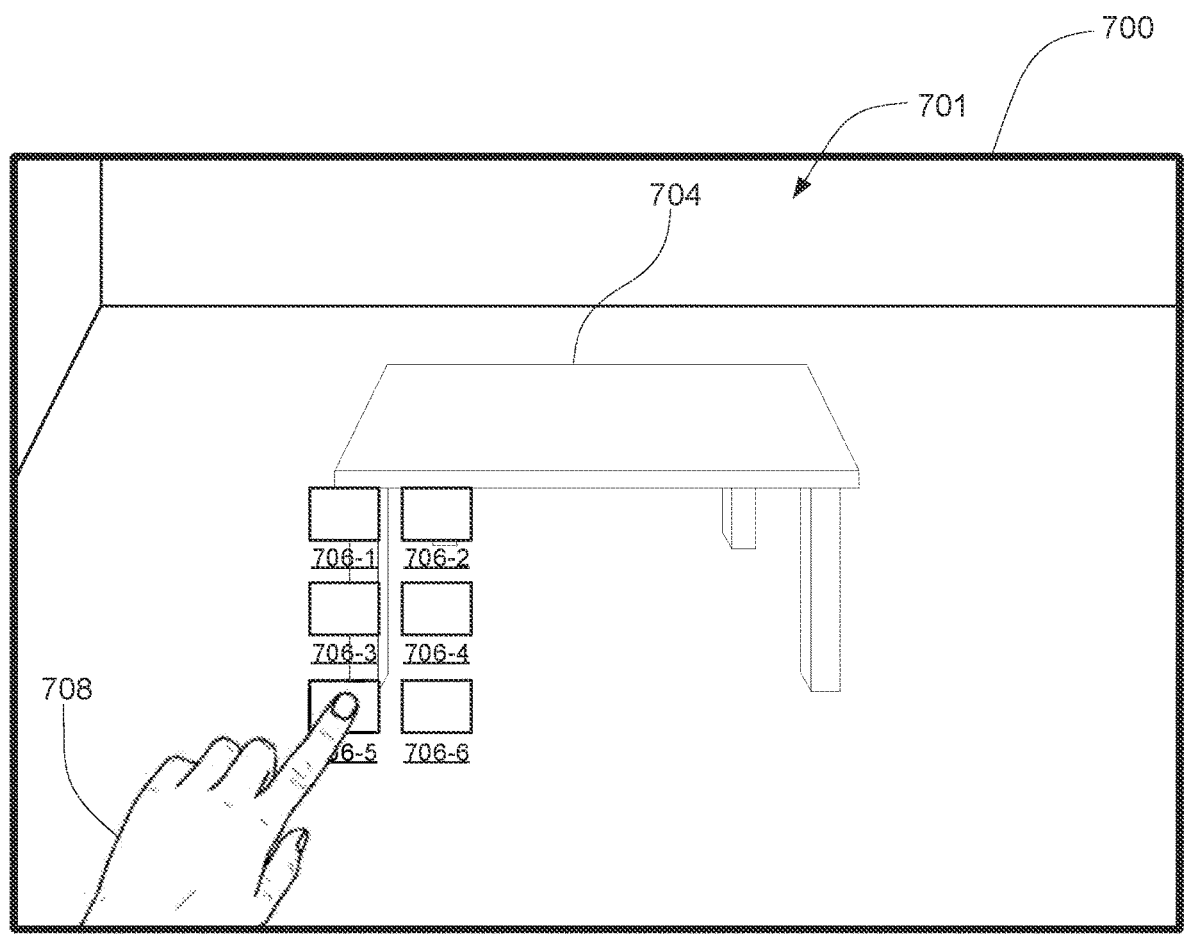
FIG. 7 illustrates a method of detaching selectable options from a surface according to some embodiments of the disclosure.

FIG. 7 illustrates a method of detaching selectable options 706 from a surface according to some embodiments of the disclosure. In FIG. 7, electronic device 700 is displaying three-dimensional environment 701, similar to three-dimensional environments 401, 501, and 601, including table 704. In FIG. 7, selectable options 706 are displayed at a location in three-dimensional environment 701 (e.g., in front of table 704) that is not associated with a surface (e.g., surfaces 310, 404, 504, 604). In some embodiments, selectable options 706 can be disassociated from the surface on which it was previously displayed and displayed in the three-dimensional environment 701 separate from the surface in response to detecting a respective gesture by a hand of the user corresponding to a request to disassociate selectable options 706 from the surface. In some embodiments, the respective gesture includes a rotation and/or change in orientation of the hand of the user (e.g., a 60 degree rotation, a 75 degree rotation, a 90 degree rotation, a 120 degree rotation, etc.) in a manner similarly to pushing selectable options 706 off of the surface (e.g., or palm of the hand). In some embodiments, the respective gesture includes a rotation and a movement of the hand (e.g., rotating the hand such that the selectable options are no longer floating on top of the hand, and a pushing movement such as to push the selectable options off the hand). In some embodiments, in response to detecting the respective gesture, device 500 disassociates selectable options 706 from the surface on which they were previously displayed and maintains selectable options 706 at a position in three-dimensional environment 701 (e.g., floating in the air), as shown in FIG. 7. Thus, in response to a respective gesture or a plurality of gestures (e.g., rotation followed by pushing movement), device 700 displays one or more selectable options in three-dimensional environment 701 (optionally floating in space and not attached to a particular surface or object). In some embodiments, while selectable options 706 is not associated with a surface, the selectable options remain displayed at a fixed location and do not move in response to the movement of the user's hand and/or of a surface. In some embodiments, the selectable options are dismissed in response to a user input corresponding to a request to dismiss display of the selectable options (e.g., selecting a selectable option, such as an "exit" affordance, to cease display of the selectable options, or performing a predetermined gesture corresponding to a request to dismiss display of the selectable options).

In some embodiments, after disassociating selectable options 706 from the surface, a user is able to select and/or execute a selectable option using the same hand that the options were displayed on (e.g., using the same hand that was holding the surface that the options were displayed on), as shown in FIG. 7. In some embodiments, a user is able to use hand 708 to perform a "press" gesture (e.g., a pointing or a tap gesture) at a location in the physical environment such that it appears as if the user is tapping on selectable option 706-5 in three-dimensional environment 701 (e.g., or tapping at a location that is within a threshold distance of selectable option 706-5, such as 0.5 inches, 1 inch, 3 inches, 6 inches, etc.). In some embodiments, in response to detecting the request to execute the selected selectable option on selectable option 706-5, device 700 performs the operation associated with selectable option 706-5. In some embodiments, the request to execute the selected selectable option includes a press or tap gesture as described above, a pinch gesture at a location such that it appears as if the user is pinching selectable option 706-5 in three-dimensional environment 701 (e.g., or pinching within a threshold distance of selectable option 706-5, such as 0.5 inches, 1 inch, 3 inches, 6 inches, etc.) or a pinch gesture while the gaze of the user is directed to selectable option 706-5 (e.g., not at a location that appears as if the user is pinching selectable option 706-5). Thus, a user is able to perform a direct selection (e.g., reaching out and interacting with the option) or an indirect selection (e.g., performing a gesture while looking at the option, without reaching towards the option).

In some embodiments, after detaching (e.g., disassociating) selectable options 706 from a surface, a user is able to perform one or more gestures (or select a respective selectable option) to cause selectable options 706 to be re-attached to the surface (or be attached to another surface). In some embodiments, re-attaching selectable options 706 to a surface (e.g., such as surface 604) causes selectable options 706 to subsequently move with the surface and/or causes selectable options 706 to be dismissed in response to the one or more criteria no longer being satisfied.

Figure 8A:
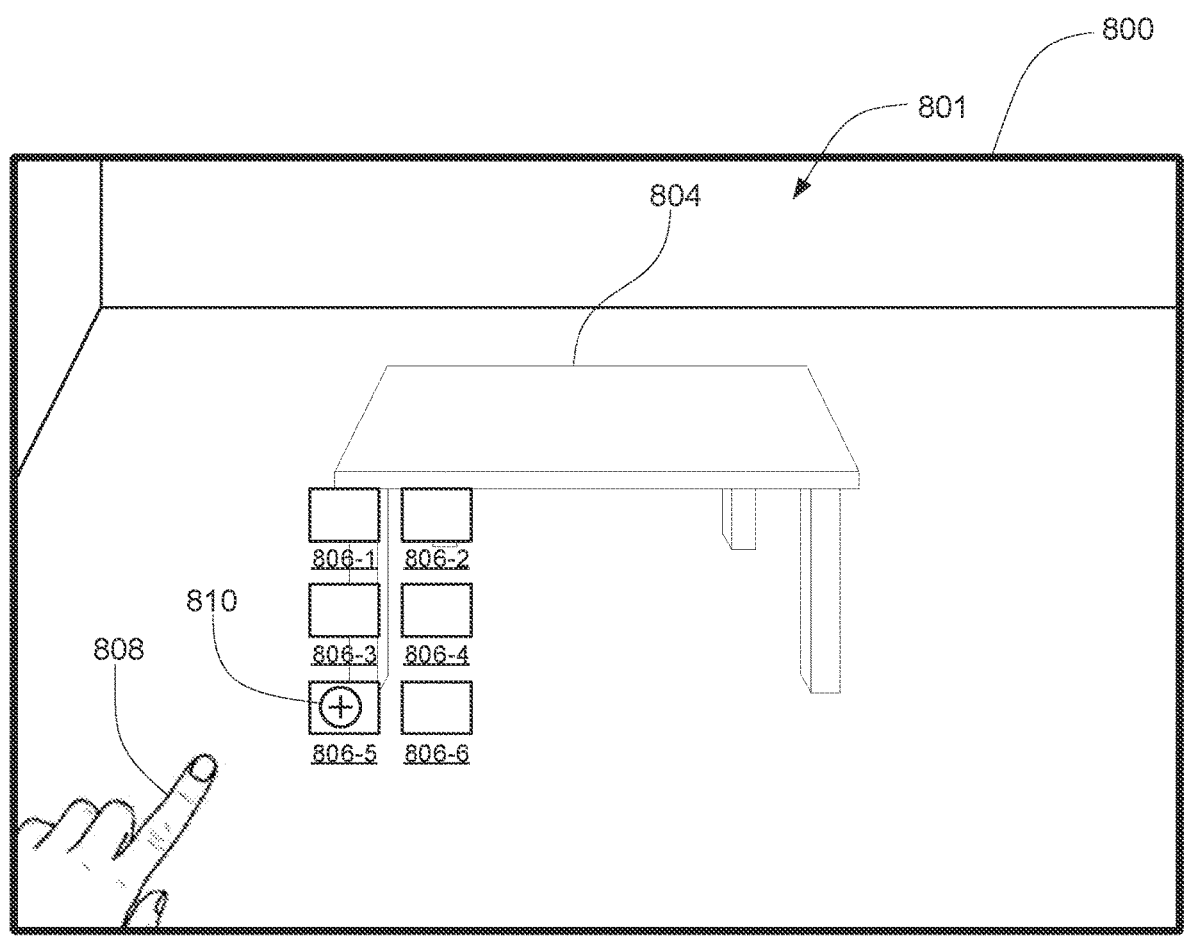
FIGS. 8A-8B illustrate a method of selecting a selectable option according to some embodiments of the disclosure.
Figure 8B:
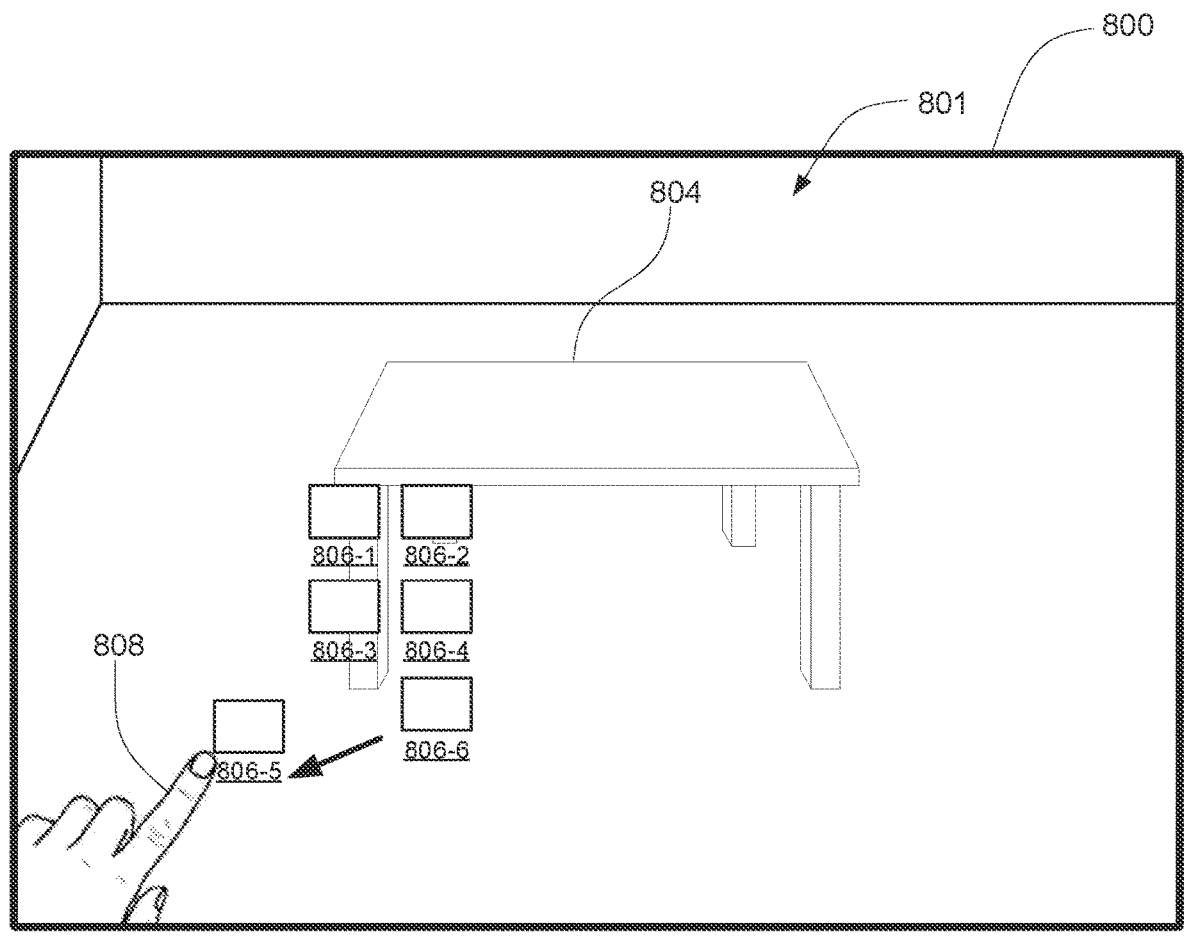

FIGS. 8A-8B illustrate a method of selecting a selectable option 806-6 according to some embodiments of the disclosure. In FIG. 8A, device 800 is displaying a three-dimensional environment 801 (e.g., similar to three-dimensional environments 401, 501, 601, and 701), including table 804 and selectable options 806. In some embodiments, selectable options 806 have been disassociated from a surface and are displayed at a location in three-dimensional environment 801 separate from a respective surface (e.g., in a manner discussed above with respect to FIG. 7).

In FIG. 8A, while the gaze 810 of the user is directed to selectable option 806-5, device 800 detects hand 808 performing a respective gesture corresponding to a request to bring selectable option 806-5 closer to hand 808. In some embodiments, the user may desire to perform a direct manipulation of selectable option 806-5 (e.g., while selectable option 806-5 is at the user's hands) instead of an indirect manipulation of selectable option 806-5 (e.g., while selectable option 806-5 is not at the user's hands) without reaching out hand 808 to a location associated with selectable option 806-5. Thus, in some embodiments, a user is able to perform a respective gesture, such as a pinch gesture followed by a pulling or tugging gesture (e.g., rotating hand 808 upwards and towards the user) and device 800 recognizes the gesture (e.g., the sequence or plurality of movements) as a request to move the selection option that the user is currently gazing at (e.g., selectable option 806-5) to hand 808. Thus, in response to detecting that hand 808 has performed the respective gesture, device 800 moves selectable option 806-5 to a location in three-dimensional environment 801 associated with hand 808, as shown in FIG. 8B. For example, selectable option 806-5 is moved to the user's fingers, or to the location of the user's pinch, or otherwise to a location such that the user is able to directly manipulate selectable option 806-5 without moving hand 808 closer or farther away from selectable option 806-5 (e.g., the user is able to perform a pinch or tap gesture to cause execution of selectable option 806-5).

In some embodiments, while selectable option 806-5 is at the location of the user's hand, the user is able to perform direct manipulation operations, such as a tap or pinch gesture to execute selectable option 806-5 or the user is able to move selectable option 806-5 by moving hand 808 while maintaining the tap or pinch gesture. In some embodiments, moving hand 808 while maintaining the selection input causes selectable option 806-5 to move with hand 808 and maintain its relative position with respect to hand 808. Thus, after selectable option 806-5 moves to the location of the user's hand, the user is able to cause execution of selectable option 806-5 by selecting selectable option 806-5 and performing a pinching gesture (e.g., which optionally the hand is already performing as part of the request to bring selectable option 806-5 closer to hand 808) followed by a releasing motion, such as a forward and/or upward motion of the hand while releasing the pinch gesture is recognized by device 800 as a request to execute an operation associated with selectable option 806-5.

Figure 9:
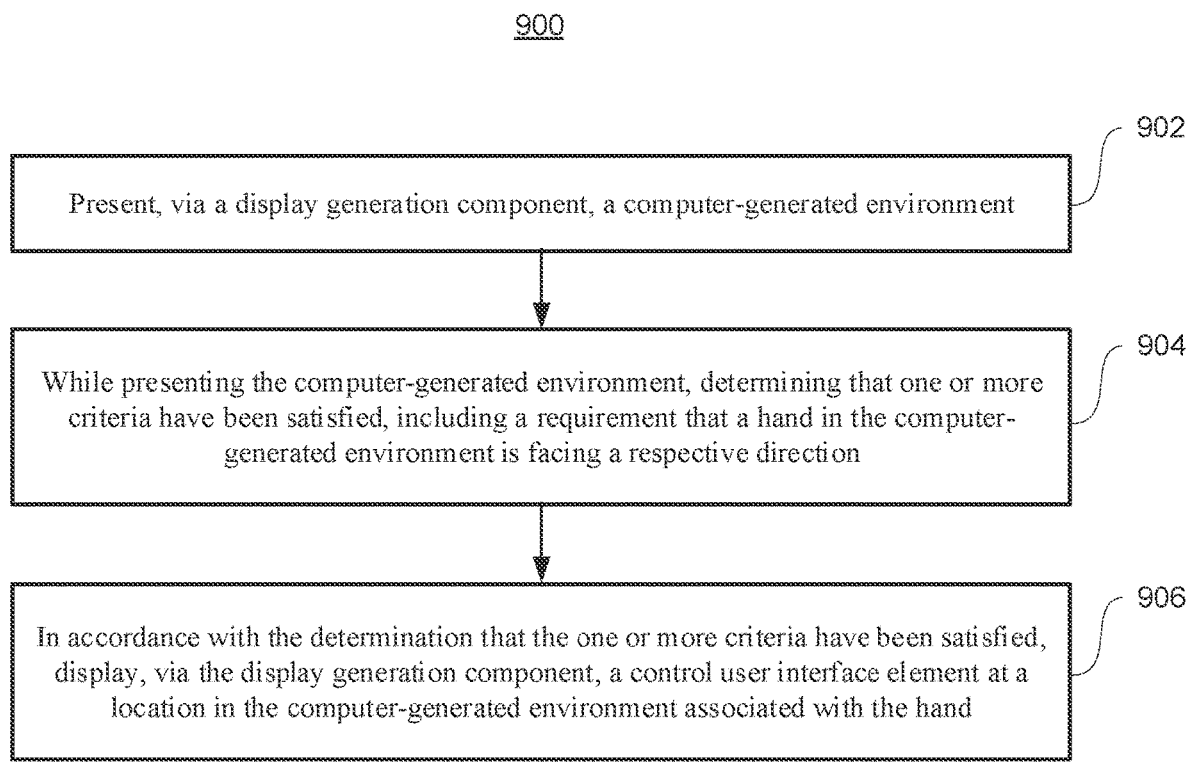
FIG. 9 is a flow diagram illustrating a method of displaying selectable options on a surface according to some embodiments of the disclosure.

FIG. 9 is a flow diagram illustrating a method 900 of displaying selectable options on a surface according to some embodiments of the disclosure. The method 900 is optionally performed at an electronic device such as device 100, and device 200 when displaying selectable options on a surface described above with reference to FIGS. 3, 4A-4D, 5, 6, 7, and 8A-8B. Some operations in method 900 are, optionally combined (e.g., with each other or with operations in method 1000) and/or order of some operations is, optionally, changed. As described below, the method 900 provides methods of displaying selectable options on a surface in accordance with embodiments of the disclosure (e.g., as discussed above with respect to FIGS. 3-8B).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (optionally a touch screen display) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (902), via the display generation component, a computer-generated environment, such as computer-generated environment 401 in FIG. 4A-4D. In some embodiments, while presenting the computer-generated environment, the electronic device determines (904) that one or more criteria have been satisfied, including a requirement that a hand in the computer-generated environment is facing a respective direction (e.g., in a manner similar to surface 404 facing towards device 400 in FIG. 4B). In some embodiments, in accordance with the determination that the one or more criteria have been satisfied, the electronic device displays (904), via the display generation component, a control user interface element at a location in the computer-generated environment associated with the hand, such as a menu including selectable options 406-1 to 406-6 in FIG. 4B. In some embodiments, the menu includes a user interface element within which the selectable options are displayed. In some embodiments, the menu comprises the collection of selectable options and does not include displaying a container object for the collection of selectable options.

In some embodiments, the computer-generated environment includes a first location corresponding to a user of the electronic device, and the respective direction is towards the first location. For example, the criterion includes a requirement that the hand is facing towards the user, facing towards the face of the user, facing towards the electronic device, facing towards one or more cameras of the electronic device, etc.

In some embodiments, the one or more criteria include a requirement that a gaze of the user is directed at the hand in the computer-generated environment. In some embodiments, the requirement that the gaze of the user is directed at the hand in the computer-generated environment is satisfied when a focus of the gaze of the user is within an area in the computer-generated environment around the hand (e.g., within a "hit area" of the hand, similarly to hit zone 312 in FIG. 3).

In some embodiments, in accordance with a determination that the control user interface element is displayed in the computer-generated environment, the area around the hand is a first size, and in accordance with a determination that the control user interface element is not displayed in the computer-generated environment, the area around the hand is a second size, smaller than the first size (e.g., the "hit area" of the hand exhibits a hysteresis effect).

In some embodiments, the one or more criteria include a requirement that the hand includes an open palm and a requirement that the palm is facing in the respective direction. In some embodiments, the control user interface element includes a plurality of affordances that are selectable to perform respective operations, such as selectable options 406-1 to 406-6 in FIG. 4B. In some embodiments, the plurality of affordances are selectable to display respective applications in the computer-generated environment, such as application 510 in FIG. 5.

In some embodiments, the computer-generated environment includes a first user interface of a first application, such as application 510 in FIG. 5. In some embodiments, in accordance with a determination that one or more application focus criteria are satisfied, the plurality of affordances are selectable to perform respective operations associated with the first application, such as selectable options 506-1 to 506-6 being selectable to perform an operation associated with application 510 in FIG. 5. In some embodiments, in accordance with a determination that the one or more application focus criteria are not satisfied, the plurality of affordances are not selectable to perform respective operations associated with the first application, such as selectable options 406-1 to 406-6 that are not selectable to launch respective applications in FIG. 4B.

In some embodiments, the one or more application focus criteria includes one or more of: a requirement that a most recent user input was directed at the first application within a threshold amount of time before the control user interface element was displayed and a requirement that a gaze of the user is directed at the first application within a threshold amount of time before the control user interface element was displayed.

In some embodiments, the electronic device presents the hand in the computer-generated environment, including presenting a portion of the physical environment that includes the hand. In some embodiments, an orientation of the control user interface element is based on an orientation of one or more objects in the computer-generated environment, such as described above in FIG. 4D.

In some embodiments, while displaying the control user interface element at the location in the computer-generated environment associated with the hand, the electronic device detects a movement of the hand, such as in FIG. 4C. In some embodiments, in accordance with a determination that the movement of the hand satisfies one or more movement criteria, the electronic device moves the control user interface element in accordance with the movement of the hand, such as in FIG. 4C.

In some embodiments, in accordance with a determination that the movement of the hand satisfies one or more disassociation criteria, different from the one or more movement criteria, the electronic device displays the control user interface element at a location in the computer-generated environment not associated with the hand, wherein the control user interface element does not move in response to detecting a movement of the hand, such as in FIG. 7.

In some embodiments, while moving the control user interface element in accordance with the movement of the hand, changing a spacing between elements in the control user interface element based at least on the movement of the hand, such as described above with respect to FIGS. 4C and 4D.

Figure 10:
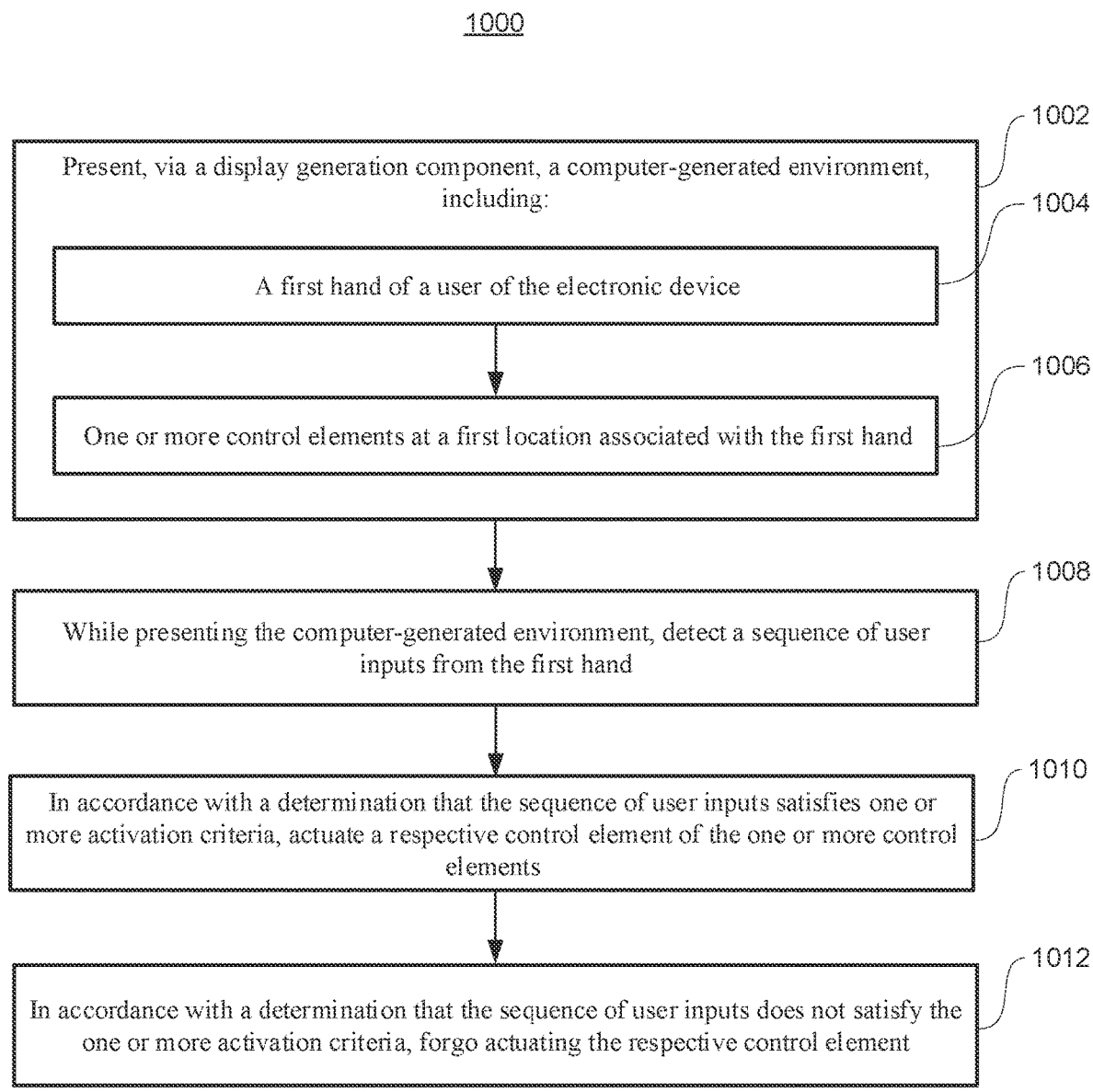
FIG. 10 is a flow diagram illustrating a method of selecting a selectable option according to some embodiments of the disclosure.

FIG. 10 is a flow diagram illustrating a method 1000 of selecting a selectable option according to some embodiments of the disclosure. The method 1000 is optionally performed at an electronic device such as device 100, and device 200 when displaying selectable options on a surface described above with reference to FIGS. 3, 4A-4D, 5, 6, 7, and 8A-8B (e.g., method 900). Some operations in method 1000 are, optionally combined (e.g., with each other or with operations in method 900) and/or order of some operations is, optionally, changed. As described below, the method 1000 provides methods of selecting a selectable option in accordance with embodiments of the disclosure (e.g., as discussed above with respect to FIGS. 3-8B).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (optionally a touch screen display) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (1002), via the display generation component, a computer-generated environment, such as computer-generated environment 401 in FIG. 4A-4D. In some embodiments, the computer-generated environment includes a first hand of a user of the electronic device (1004) and one or more control elements at a first location associated with the first hand (1006), such as hand 408 and selectable options 406-1 to 406-6 in FIG. 4B. In some embodiments, while presenting the computer-generated environment, the electronic device detects (1008) a plurality (e.g., a sequence) of user inputs from the first hand, such as the selection gesture in FIG. 6 and the gesture for detaching the selectable options followed by a selection gesture in FIG. 7. In some embodiments, in accordance with a determination that the plurality of user inputs satisfies one or more activation criteria (e.g., the user is gazing at a respective option, the plurality of user inputs includes a selection gesture by the same hand on which the selectable options are displayed and/or the plurality of user inputs includes a request to detach the selectable options from the hand followed by a selection gesture while gazing at a respective option), the electronic device actuates (1010) a respective control element of the one or more control elements, such as in FIG. 6 and FIG. 7. In some embodiments, in accordance with a determination that the plurality of user inputs does not satisfy the one or more activation criteria, the electronic device forgoes (1012) actuating the respective control element.

In some embodiments, before detecting the plurality of user inputs, the one or more control elements are configured in an attached mode, wherein the one or more control elements move in accordance with a movement of the first hand of the user, such as in FIG. 4B-4D. In some embodiments, the one or more activation criteria include a requirement that the plurality of user inputs includes a first gesture by the first hand of the user corresponding to a detachment operation and a second gesture, after the first gesture, corresponding to a selection operation directed to the respective control element of the one or more control elements, such as in FIG. 7. In some embodiments, in response to detecting the first gesture by the first hand of the user, the electronic device configures the one or more control elements in a detached mode, wherein the one or more control movements do not move in accordance with the movement of the first hand of the user, such as in FIG. 7.

In some embodiments, the one or more activation criteria include a requirement that the plurality of user inputs includes a first gesture by the first hand of the user corresponding to a selection operation, such as the pinch gesture in FIG. 6 and FIG. 7. In some embodiments, the first gesture is a pinch gesture by the first hand, such as in FIG. 6 and FIG. 7. In some embodiments, the one or more activation criteria further include a requirement that a gaze of the user is directed at the respective control element of the one or more control elements, such as gaze 610 in FIG. 6.

In some embodiments, before actuating the respective control element of the one or more control elements, the electronic device detects that the gaze of the user is no longer directed at the respective control element. In some embodiments, in response to detecting that the gaze of the user is no longer directed at the respective control element, the electronic device forgoes actuating the respective control element. For example, if the electronic device detects that the user has moved his or her gaze away from a respective selectable option when the selection input is received, the electronic device does not actuate the selectable option.

In some embodiments, before actuating the respective control element of the one or more control elements, the electronic device moves the respective control element to a location associated with the pinch gesture of the first hand, such as moving selectable option 606-5 towards hand 808, before optionally actuating selectable option 606-5 in FIG. 8B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:
1. A method comprising:
at an electronic device in communication with a display:
presenting, via the display, a three-dimensional environment;

while presenting the three-dimensional environment, determining that one or more criteria have been satisfied, including a requirement that a hand in the three-dimensional environment is oriented in a predetermined manner with respect to the electronic device, and a requirement that a gaze of a user is directed at the hand or within a threshold distance of the hand within the three-dimensional environment; and in accordance with the determination that the one or more criteria have been satisfied, displaying, via the display, a control user interface element at a location in the three-dimensional environment associated with the predetermined manner in which the hand is oriented with respect to the electronic device.

2. The method of claim 1, wherein the three-dimensional environment includes a first location corresponding to a user of the electronic device, and an orientation of the hand in the predetermined manner is towards the first location.

3. The method of claim 1, wherein the three-dimensional environment includes a first location corresponding to a user of the electronic device, and an orientation of the hand in the predetermined manner is within a threshold number of degrees of a vector pointing from the hand to the first location.

4. The method of claim 1, wherein the determination that the one or more criteria have been satisfied includes determining, via an image sensor, a predetermined pose of the hand within the three-dimensional environment.

5. The method of claim 1, wherein the requirement that the gaze of the user is directed at the hand in the three-dimensional environment is satisfied when a focus of the gaze of the user is within an area in the three-dimensional environment around the hand.

6. The method of claim 5, wherein:
in accordance with a determination that the control user interface element is displayed in the three-dimensional environment, the area around the hand is a first size; and
in accordance with a determination that the control user interface element is not displayed in the three-dimensional environment, the area around the hand is a second size, smaller than the first size.

7. The method of claim 1, wherein the one or more criteria include a requirement that the hand includes an open palm and a requirement that the open palm is oriented in the predetermined manner with respect to the electronic device.

8. The method of claim 1, wherein the control user interface element includes a plurality of affordances that are selectable to perform respective operations.

9. The method of claim 8, wherein the plurality of affordances are selectable to display respective applications in the three-dimensional environment.

10. The method of claim 8, further comprising:
while displaying the control user interface element at the location in the three-dimensional environment associated with the predetermined manner in which the hand is oriented:
detecting the gaze of the user, and
detecting a plurality of user inputs from the hand; and
in accordance with a determination that the gaze of the user is directed at an affordance from the plurality of affordances, and in accordance with a determination that the plurality of user inputs from the hand satisfies one or more selection criteria, selecting the affordance.

11. The method of claim 8, wherein:
the three-dimensional environment includes a first user interface of a first application;
in accordance with a determination that one or more application focus criteria are satisfied, the plurality of affordances are selectable to perform respective operations associated with the first application; and
in accordance with a determination that the one or more application focus criteria are not satisfied, the plurality of affordances are not selectable to perform respective operations associated with the first application.

12. The method of claim 11, wherein the one or more application focus criteria includes one or more of:
a requirement that a most recent user input was directed at the first application within a first threshold amount of time before the control user interface element was displayed, and
a requirement that the gaze of the user is directed at the first application within a second threshold amount of time before the control user interface element was displayed.

13. The method of claim 1, further comprising:
presenting the hand in the three-dimensional environment, including presenting a portion of a physical environment that includes the hand.

14. The method of claim 1, wherein an orientation of the control user interface element is based on an orientation of one or more objects in the three-dimensional environment.

15. The method of claim 1, further comprising:
while displaying the control user interface element at the location in the three-dimensional environment associated with the predetermined manner in which the hand is oriented, detecting a movement of the hand; and
in accordance with a determination that the movement of the hand satisfies one or more movement criteria, moving the control user interface element in accordance with the movement of the hand.

16. The method of claim 15, further comprising:
in accordance with a determination that the movement of the hand satisfies one or more disassociation criteria, different from the one or more movement criteria, displaying the control user interface element at a location in the three-dimensional environment not associated with the hand, wherein the control user interface element does not move in response to detecting a movement of the hand.

17. The method of claim 15, further comprising:
while moving the control user interface element in accordance with the movement of the hand, changing a spacing between elements in the control user interface element based at least on the movement of the hand.

18. An electronic device, comprising:
one or more processors;
memory; and
one or more programs, wherein the one or more programs are stored in the memory and configured to be executed by the one or more processors, the one or more programs including instructions for:
presenting, via a display, a three-dimensional environment;
while presenting the three-dimensional environment, determining that one or more criteria have been satisfied, including a requirement that a hand in the three-dimensional environment is oriented in a predetermined manner with respect to the electronic device, and a requirement that a gaze of a user is directed at the band, or within a threshold distance of the hand within the three-dimensional environment; and in accordance with the determination that the one or more criteria have been satisfied, displaying, via the display, a control user interface element at a location in the three-dimensional environment associated with the predetermined manner in which the hand is oriented with respect to the electronic device.

19. A non-transitory computer readable storage medium storing one or more programs, the one or more programs comprising instructions, which when executed by one or more processors of an electronic device, cause the electronic device to:

present, via a display, a three-dimensional environment;
while presenting the three-dimensional environment, determine that one or more criteria have been satisfied, including a requirement that a hand in the three-dimensional environment is oriented in a predetermined manner with respect to the electronic device, and a requirement that a gaze of a user is directed at the hand, or within a threshold distance of the hand within the three-dimensional environment with respect to the electronic device; and in accordance with the determination that the one or more criteria have been satisfied, display, via the display, a control user interface element at a location in the three-dimensional environment associated with the predetermined manner in which the hand is oriented with respect to the electronic device.

20. The electronic device of claim 18, wherein the three-dimensional environment includes a first location corresponding to a user of the electronic device, and an orientation of the hand in the predetermined manner is towards the first location.

21. The electronic device of claim 18, wherein the three-dimensional environment includes a first location corresponding to a user of the electronic device, and an orientation of the hand in the predetermined manner is within a threshold number of degrees of a vector pointing from the hand to the first location.

22. The electronic device of claim 18, wherein the determination that the one or more criteria have been satisfied includes determining, via an image sensor, a predetermined pose of the hand within the three-dimensional environment.

23. The electronic device of claim 18, wherein the requirement that the gaze of the user is directed at the hand in the three-dimensional environment is satisfied when a focus of the gaze of the user is within an area in the three-dimensional environment around the hand.

24. The electronic device of claim 23, wherein:
in accordance with a determination that the control user interface element is displayed in the three-dimensional environment, the area around the hand is a first size; and
in accordance with a determination that the control user interface element is not displayed in the three-dimensional environment, the area around the hand is a second size, smaller than the first size.

25. The electronic device of claim 18, wherein the one or more criteria include a requirement that the hand includes an open palm and a requirement that the open palm is oriented in the predetermined manner with respect to the electronic device.

26. The electronic device of claim 18, wherein the control user interface element includes a plurality of affordances that are selectable to perform respective operations.

27. The electronic device of claim 26, wherein the plurality of affordances are selectable to display respective applications in the three-dimensional environment.

28. The electronic device of claim 26, the one or more programs including instructions for:
while displaying the control user interface element at the location in the three-dimensional environment associated with the predetermined manner in which the hand is oriented:
detecting the gaze of the user, and
detecting a plurality of user inputs from the hand; and
in accordance with a determination that the gaze of the user is directed at an affordance from the plurality of affordances, and in accordance with a determination that the plurality of user inputs from the hand satisfies one or more selection criteria, selecting the affordance.

29. The electronic device of claim 26, wherein:
the three-dimensional environment includes a first user interface of a first application;
in accordance with a determination that one or more application focus criteria are satisfied, the plurality of affordances are selectable to perform respective operations associated with the first application; and
in accordance with a determination that the one or more application focus criteria are not satisfied, the plurality of affordances are not selectable to perform respective operations associated with the first application.

30. The electronic device of claim 29, wherein the one or more application focus criteria includes one or more of:
a requirement that a most recent user input was directed at the first application within a first threshold amount of time before the control user interface element was displayed, and
a requirement that the gaze of the user is directed at the first application within a second threshold amount of time before the control user interface element was displayed.

31. The electronic device of claim 18, the one or more programs including instructions for:
presenting the hand in the three-dimensional environment, including presenting a portion of a physical environment that includes the hand.

32. The electronic device of claim 18, wherein an orientation of the control user interface element is based on an orientation of one or more objects in the three-dimensional environment.

33. The electronic device of claim 18, the one or more programs including instructions for:
while displaying the control user interface element at the location in the three-dimensional environment associated with the predetermined manner in which the hand is oriented, detecting a movement of the hand; and
in accordance with a determination that the movement of the hand satisfies one or more movement criteria, moving the control user interface element in accordance with the movement of the hand.

34. The electronic device of claim 33, the one or more programs including instructions for:
in accordance with a determination that the movement of the hand satisfies one or more disassociation criteria, different from the one or more movement criteria, displaying the control user interface element at a location in the three-dimensional environment not associated with the hand, wherein the control user interface element does not move in response to detecting a movement of the hand.

35. The electronic device of claim 33, the one or more programs including instructions for:
while moving the control user interface element in accordance with the movement of the hand, changing a spacing between elements in the control user interface element based at least on the movement of the hand.

36. The non-transitory computer readable storage medium of claim 19, wherein the three-dimensional environment includes a first location corresponding to a user of the electronic device, and an orientation of the hand in the predetermined manner is towards the first location.

37. The non-transitory computer readable storage medium of claim 19, wherein the three-dimensional environment includes a first location corresponding to a user of the electronic device, and an orientation of the hand in the predetermined manner is within a threshold number of degrees of a vector pointing from the hand to the first location.

38. The non-transitory computer readable storage medium of claim 19, wherein the determination that the one or more criteria have been satisfied includes determining, via an image sensor, a predetermined pose of the hand within the three-dimensional environment.

39. The non-transitory computer readable storage medium of claim 19, wherein the requirement that the gaze of the user is directed at the hand in the three-dimensional environment is satisfied when a focus of the gaze of the user is within an area in the three-dimensional environment around the hand.

40. The non-transitory computer readable storage medium of claim 39, wherein:
in accordance with a determination that the control user interface element is displayed in the three-dimensional environment, the area around the hand is a first size; and
in accordance with a determination that the control user interface element is not displayed in the three-dimensional environment, the area around the hand is a second size, smaller than the first size.

41. The non-transitory computer readable storage medium of claim 19, wherein the one or more criteria include a requirement that the hand includes an open palm and a requirement that the open palm is oriented in the predetermined manner with respect to the electronic device.

42. The non-transitory computer readable storage medium of claim 19, wherein the control user interface element includes a plurality of affordances that are selectable to perform respective operations.

43. The non-transitory computer readable storage medium of claim 42, wherein the plurality of affordances are selectable to display respective applications in the three-dimensional environment.

44. The non-transitory computer readable storage medium of claim 42, the one or more programs comprising instructions, which when executed by one or more processors of an electronic device, cause the electronic device to:
display the control user interface element at the location in the three-dimensional environment associated with the predetermined manner in which the hand is oriented:
detect the gaze of the user, and detect a plurality of user inputs from the hand; and
in accordance with a determination that the gaze of the user is directed at an affordance from the plurality of affordances, and in accordance with a determination that the plurality of user inputs from the hand satisfies one or more selection criteria, selecting the affordance.

45. The non-transitory computer readable storage medium of claim 42, wherein:
the three-dimensional environment includes a first user interface of a first application;
in accordance with a determination that one or more application focus criteria are satisfied, the plurality of affordances are selectable to perform respective operations associated with the first application; and
in accordance with a determination that the one or more application focus criteria are not satisfied, the plurality of affordances are not selectable to perform respective operations associated with the first application.

46. The non-transitory computer readable storage medium of claim 45, wherein the one or more application focus criteria includes one or more of:
a requirement that a most recent user input was directed at the first application within a first threshold amount of time before the control user interface element was displayed, and
a requirement that the gaze of the user is directed at the first application within a second threshold amount of time before the control user interface element was displayed.

47. The non-transitory computer readable storage medium of claim 19, the one or more programs comprising instructions, which when executed by one or more processors of an electronic device, cause the electronic device to:
present the hand in the three-dimensional environment, including presenting a portion of a physical environment that includes the hand.

48. The non-transitory computer readable storage medium of claim 19, wherein an orientation of the control user interface element is based on an orientation of one or more objects in the three-dimensional environment.

49. The non-transitory computer readable storage medium of claim 19, the one or more programs comprising instructions, which when executed by one or more processors of an electronic device, cause the electronic device to:
while displaying the control user interface element at the location in the three-dimensional environment associated with the predetermined manner in which the hand is oriented, detect a movement of the hand; and
in accordance with a determination that the movement of the hand satisfies one or more movement criteria, move the control user interface element in accordance with the movement of the hand.

50. The non-transitory computer readable storage medium of claim 49, the one or more programs comprising instructions, which when executed by one or more processors of an electronic device, cause the electronic device to:
in accordance with a determination that the movement of the hand satisfies one or more disassociation criteria, different from the one or more movement criteria, display the control user interface element at a location in the three-dimensional environment not associated with the hand, wherein the control user interface element does not move in response to detecting a movement of the hand.

51. The non-transitory computer readable storage medium of claim 49, the one or more programs comprising instructions, which when executed by one or more processors of an electronic device, cause the electronic device to:
while moving the control user interface element in accordance with the movement of the hand, change a spacing between elements in the control user interface element based at least on the movement of the hand.

\* \* \* \* \*